United States Patent [19]

Simms

[11] Patent Number: 5,586,280
[45] Date of Patent: Dec. 17, 1996

[54] METHOD AND APPARATUS FOR APPENDING DATA TO COMPRESSED RECORDS PREVIOUSLY STORED ON A SEQUENTIALLY-ACCESSIBLE STORAGE MEDIUM

[75] Inventor: Mark J. Simms, Bristol, England

[73] Assignee: Hewlett-Packard Company, Palo Alto, Calif.

[21] Appl. No.: 417,467

[22] Filed: Apr. 5, 1995

Related U.S. Application Data

[63] Continuation of Ser. No. 952,623, filed as PCT/GB91/00844, May 28, 1991, published as WO91/19289, Dec. 12, 1991, abandoned.

[30] Foreign Application Priority Data

May 29, 1990 [EP] European Pat. Off. .............. 90305837

[51] Int. Cl.⁶ .......................... G06F 12/06; G06F 17/30
[52] U.S. Cl. .................. 395/404; 395/602; 395/462; 395/888; 395/417; 395/421.08; 364/DIG. 1; 364/236.3; 364/248.2; 364/251
[58] Field of Search .................... 395/404, 888, 395/462, 417, 421.08, 600; 364/DIG. 1

[56] References Cited

U.S. PATENT DOCUMENTS

| | | | |
|---|---|---|---|
| 4,586,027 | 4/1986 | Tsukiyama | 341/95 |
| 4,775,969 | 10/1988 | Osterlund | 369/53 |
| 4,849,878 | 7/1989 | Roy | 395/600 |
| 4,853,921 | 8/1989 | Takeda | 369/59 |
| 4,868,570 | 9/1989 | Davis | 341/106 |
| 4,891,784 | 1/1990 | Kato | 395/250 |
| 5,194,995 | 3/1993 | Severtson et al. | 360/48 |
| 5,200,864 | 4/1993 | Dunn | 360/48 |
| 5,280,600 | 1/1994 | Van Maren et al. | 395/425 |
| 5,298,895 | 3/1994 | Van Maren | 341/51 |
| 5,313,604 | 5/1994 | Godwin | 395/425 |
| 5,335,328 | 8/1994 | Dunn et al. | 395/275 |
| 5,481,701 | 1/1996 | Chambers, IV | 395/600 |

FOREIGN PATENT DOCUMENTS

| | | |
|---|---|---|
| 263014 | 4/1988 | European Pat. Off. . |
| 286719 | 10/1988 | European Pat. Off. . |
| 321077 | 6/1989 | European Pat. Off. . |
| 324542 | 7/1989 | European Pat. Off. . |

Primary Examiner—Thomas G. Black
Assistant Examiner—Jean R. Homere

[57] ABSTRACT

A method of appending data to compressed data stored on tape (10) in the form of records ($CR_n$) wherein compressed data is stored in groups ($G_n$) independently of the record structure of the data and each group has an associated data structure (4), containing information relating to the group contents in terms of entities ($E_n$), where an entity can contain more than one record, and means (H) for storing information on the number of records in each entity ($E_n$) characterised by locating the entity containing the last record to be retained and changing said stored information to indicate the number of wanted records in that entity and writing the data being appended to a subsequent new entity.

5 Claims, 21 Drawing Sheets

| | FLAG | | | | | | | COUNT |
|---|---|---|---|---|---|---|---|---|
| | SKP | XFR | EOT | CMP | MBR | BOR | EOR | |
| SEPARATOR MARK | 0 | 0 | 0 | X | 1 | 1 | 1 | 0,1 (SIGNIFY DIFFERENT MARK TYPES) |
| TOTALLY CONTAINED RECORD | 0 | 1 | 0 | X | 0 | 1 | 1 | FULL RECORD BYTE COUNT |
| START OF PART RECORD | 0 | 1 | 0 | X | 0 | 1 | 0 | FIRST PART BYTE COUNT |
| MIDDLE PART OF RECORD | 0 | 1 | 0 | X | 0 | 0 | 0 | MIDDLE PART BYTE COUNT |
| END PART OF RECORD | 0 | 1 | 1 | X | 0 | 0 | 0 | END PART BYTE COUNT |
| TOTAL COUNT | 0 | 0 | 0 | X | 0 | 0 | 1 | TOTAL RECORD BYTE COUNT |
| SKIP ENTRY | 1 | 0 | 0 | X | 0 | 0 | 0 | GROUP SIZE MINUS DATA AREA SIZE |

| FLAG | COUNT |
|---|---|
| 0 1 1 0 X 0 1 1 | BC 1 |
| 0 1 1 0 X 0 1 1 | BC 2 |
| 0 0 0 0 X 1 1 1 | FM |
| 0 1 1 0 X 0 1 1 | BC 3 |
| 0 1 1 0 X 0 1 1 | BC 4 |
| 0 1 1 0 X 0 1 1 | BC 5 |
| 0 0 0 0 X 1 1 1 | FM |
| 0 1 1 0 X 0 1 1 | BC 6 |
| 0 1 1 0 X 0 1 1 | BC 7 |
| 0 0 0 0 X 1 1 1 | FM |
| 0 1 1 0 X 0 1 1 | BC 8 |
| 0 0 0 0 X 1 1 1 | FM |
| 0 1 0 0 X 0 1 0 | BC 9a |
| 1 0 0 0 X 0 0 0 | SKIP COUNT |

FIG 4

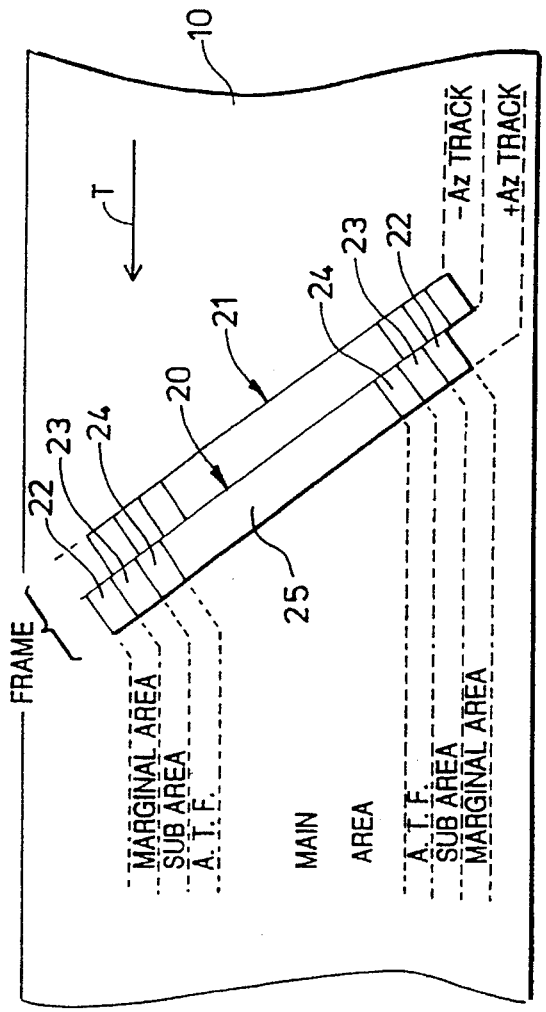
FIG 12
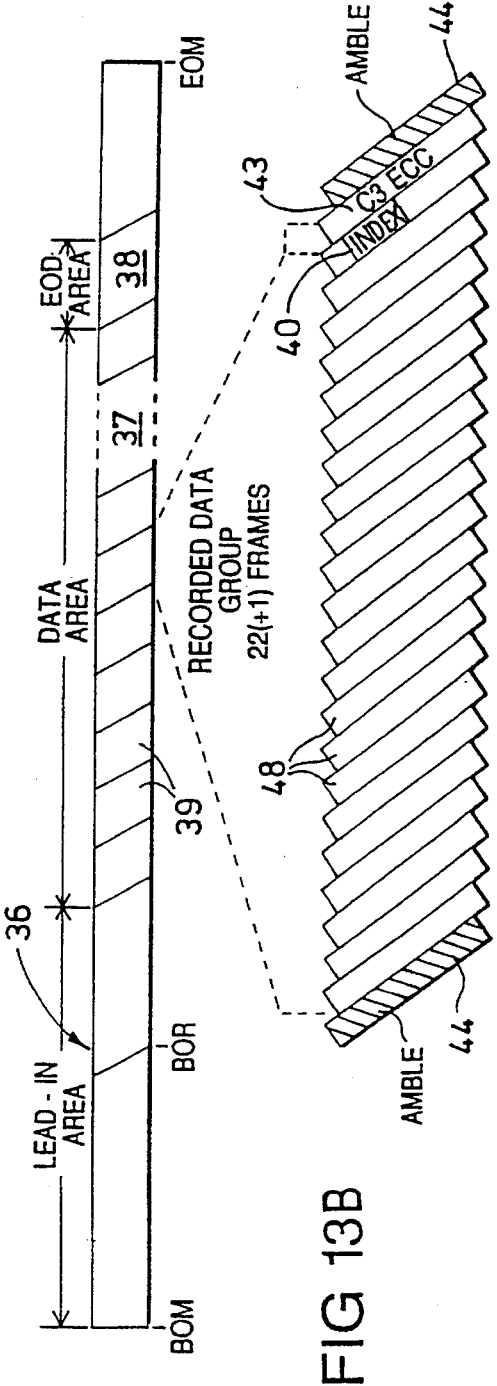
FIG 13A
FIG 13B

BASIC GROUP

G1 SUB - GROUPS

G2 SUB - GROUPS

FIG 18

| WORD NUMBER | CHANNEL A | | CHANNEL B | |
|---|---|---|---|---|
| | LOWER BYTE | UPPER BYTE | LOWER BYTE | UPPER BYTE |
| | 1 2 3 4 5 6 7 8 | 1 2 3 4 5 6 7 8 | 1 2 3 4 5 6 7 8 | 1 2 3 4 5 6 7 8 |
| 0 (HEADER) | DF-ID 0 0 0 0 | LF - ID | DF-ID 0 0 0 0 | LF - ID |
| 1 | D0 | D1 | D2 | D3 |
| 2 | D4 | D5 | D6 | D7 |
| 3 | D8 | D9 | D10 | D11 |
| ⋮ | ⋮ | ⋮ | ⋮ | ⋮ |
| 1438 | D5748 | D5749 | D5750 | D5751 |
| 1439 | D5752 | D5753 | D5754 | D5755 |
| 1440 ⋮ 1455 | ALL BYTES SET TO ALL ZEROs | | | |

G3 SUB - GROUP

FIG 19

TWIN ARRAYS FOR G4 SUB - GROUP

COLUMN NO. → 0, 1, 2, 3, 4, 5, ... 50, 51, 52, 53, ... 75, 76, 77, ... 126, 127

BYTE SERIAL NO. ↓ 0–31

C1, C2

MAIN DATA BLOCK

SUB DATA BLOCK

| ZONE | CONTENTS | NUMBER OF BLOCKS |
|---|---|---|
| MARGIN ZONE 1 | MARGIN BLOCKS | 11 |
| SUB ZONE 1 | PREAMBLE BLOCKS<br>REC. SUB DATA BLOCKS<br>POSTAMBLE BLOCKS | 2<br>8<br>1 |
| ATF ZONE 1 | SPACER BLOCKS<br>ATF BLOCKS<br>SPACER BLOCKS | 3<br>5<br>3 |
| MAIN ZONE | PREAMBLE BLOCKS<br>REC. MAIN DATA BLOCKS | 2<br>128 |
| ATF ZONE 2 | SPACER BLOCKS<br>ATF BLOCKS<br>SPACER BLOCKS | 3<br>5<br>3 |
| SUB ZONE 2 | PREAMBLE BLOCKS<br>REC. SUB DATA BLOCKS<br>POSTAMBLE BLOCKS | 2<br>8<br>1 |
| MARGIN ZONE 2 | MARGIN BLOCKS | 11 |

SEQUENCE OF RECORDING ↓

Total: 196

FORMAT OF A TRACK

FIG 22

METHOD AND APPARATUS FOR APPENDING DATA TO COMPRESSED RECORDS PREVIOUSLY STORED ON A SEQUENTIALLY-ACCESSIBLE STORAGE MEDIUM

This is a continuation of application Ser. No. 07/952,623, filed as PCT/GB91/00844, May 28, 1991, published as WO91/19289, Dec. 12, 1991 and now abandoned.

BACKGROUND AND SUMMARY OF THE INVENTION

The present invention relates to a tape storage device and in particular, but not exclusively, to a tape storage device intended for storing host computer data. The present invention is applicable to a method of appending data to compressed data already stored on tape.

It is known to provide a tape drive having data compression capability (a DC drive) so that, as data arrives from a host, it is compressed before being written to tape thus increasing the tape storage capacity. DC drives are also able to read compressed data from tape and to decompress the data before sending it to a host. It is also possible for a host to perform software compression and/or decompression of user data.

There is more than one type of data compression. For example, removing separation marks eg. designating records, files etc. from the datastream and storing information regarding the positions of these marks in an index effectively compresses the user data. Another, quite different approach, is to compress user data by removing redundancy in the data eg. by replacing user data words with codewords or symbols from which the original data can be recovered. It is the latter type which is being referred to in this specification when the words "data compression" or abbreviation DC is used.

It is known to write user data records to tape in fixed size groups independently of the record structure of the data words and to put information regarding the contents of each group in an index associated with each group. For example, the index may contain information regarding the length of each record or partial record in the group. A further development, which is the subject of copending PCT Application no. WO 91/11 001, is to write the data to tape in groups independently of the record structure of the data words wherein each group has an associated index and to write to the index of each relevant group information about the contents of the group in terms of entities, where an entity can contain more than one record and no separate entry is written to the index about any individual record in that entity.

This approach has the advantage that it reduces the storage management overhead associated with the group index by reducing the number of entries which need to be made in the index, thus increasing the speed of access to data during read and write operations.

Tape storage devices of the aforesaid types include storage devices operative to write/read data to/from tape in accordance with the Digital Data Storage (DDS) format described in the document "Digital Data Storage Format Description" (Revision B, October 1988) available from Hewlett-Packard Limited, Bristol, England. The DDS format is based on the DAT digital audio recording format but includes modifications and extensions to the basic DAT format to render it suitable for storing computer data. An extension to the DDS format is the DDS-DC format described in the document entitled "DDS-DC Format Specification No. DDS-06 Revision A dated January 1990", also available from Hewlett Packard Ltd, Bristol, England. The DDS-DC format is for storage of compressed data on tape.

According to the DDS-DC format, compressed records are organised into entities and groups. A group index contains information on the compressed byte count for each entity in the group. Each entity has a header portion which contains information including the number of records in the entity, the uncompressed byte count for these records and the identity of the compression algorithm used to compress the data in the entity.

Currently, when appending compressed records to a point within an entity on tape, say after the nth record in an entity, the procedure is to decompress the first n records in the entity to find the end of the nth record and then to compress these n records so as to build the a dictionary (as described below) ready for compressing the new records being appended. This procedure is laborious and, in addition, there may be insufficient buffer space in the drive to store the n decompressed records.

According to one aspect of the present invention we provide a method of appending data to compressed data stored on tape in the form of records wherein compressed data is stored in groups independently of the record structure of the data and each group has an associated data structure containing information relating to the group contents in terms of entities, where an entity can contain more than one record, and means for storing information on the number of records in each entity characterised by locating the entity containing the last record to be retained and changing said stored information to indicate the number of wanted records in that entity and writing the data being appended to a subsequent new entity.

The present invention has the advantage that it obviates the need to decompress records in the entity containing the last record to be retained in order to locate the end of that record. For example, if the relevant entity contains ten records and it is desired to append new data after the sixth of these records, the invention entails changing the "number of records" entry in the entity header from ten to six and writing the new data to tape beginning with a new entity. The last four records in the existing entity will thereafter be ignored, but remain on tape. Note that whenever data is appended to data stored on tape, all of the existing data after the point on tape at which data is appended is lost. The data being appended may be compressed data or uncompressed data.

Several different algorithms are known for compressing data. One approach is to convert the user data to code words using a dictionary which is created dynamically as the data is compressed. The dictionary is recreated, again dynamically, during decompression. An algorithm which adopts this approach is the LEMPEL ZIV WELCH algorithm or the LZW algorithm.

During data compression, a DC drive operating according to the LZW algorithm inserts codewords into the datastream indicative of when a new dictionary is started (the RESET codeword) and when data is flushed i.e. the small amount of data held in a buffer awaiting compression is passed through before further incoming data is sent to the buffer (the FLUSH codeword).

Using the LZW algorithm, to achieve decompression of part of the compressed data on a tape, it is necessary to begin decompressing from a RESET code word in order to be able to recreate the relevant dictionary. Normally, a FLUSH operation is performed prior to beginning a new dictionary so that the new dictionary can start at a convenient point in the data eg. at the beginning of a record.

If the data being appended is compressed according to such an algorithm, it is necessary to start a new dictionary for the data being appended.

In the embodiment to be described, the method comprises storing information on the number of records in each entity in an entity header portion. In that embodiment, information on the cumulative total of the number of records on tape is also stored for each group and the method further comprises changing said stored cumulative information to reflect the number of wanted records in the relevant group.

According to another aspect of the present invention we provide a method of appending data to data stored on tape wherein the data on tape is stored in collections of records and information on the contents of each collection is also stored on tape characterised by locating the collection containing the last record to be retained and changing said stored information to indicate the number of wanted records in that collection and writing the data being appended to a subsequent new collection.

Thus the present invention has application whenever information regarding collections of records is stored on tape and, instead of locating the end of the last record to be retained, it is easier to amend stored information so that the unwanted records in the relevant collection are subsequently ignored.

The data already on tape to which new data is being appended need not necessarily be compressed information, although it is for appending to compressed data that the present invention is envisaged to be most useful.

According to a further aspect of the present invention we provide a storage device which operates in accordance with any of the methods as described above.

BRIEF DESCRIPTION OF THE DRAWINGS

A particular embodiment of the present invention will now be described, by way of example, with reference to the accompanying drawings in which.

Figure 1:
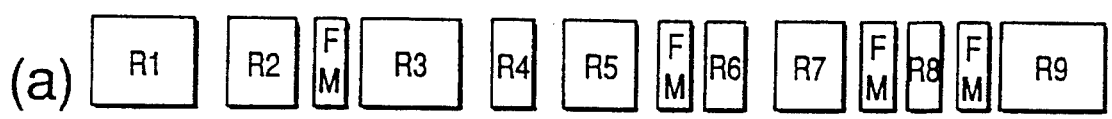
FIG. 1 is a multi-part diagram illustrating a scheme for storing computer data where.
Figure 1:
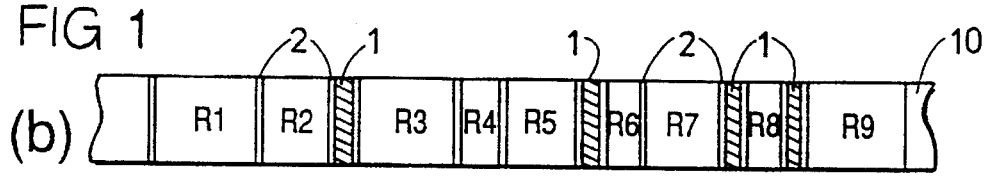
Figure 1:
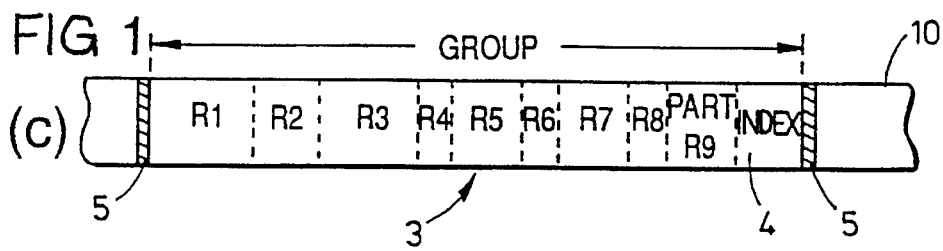
Figure 2:
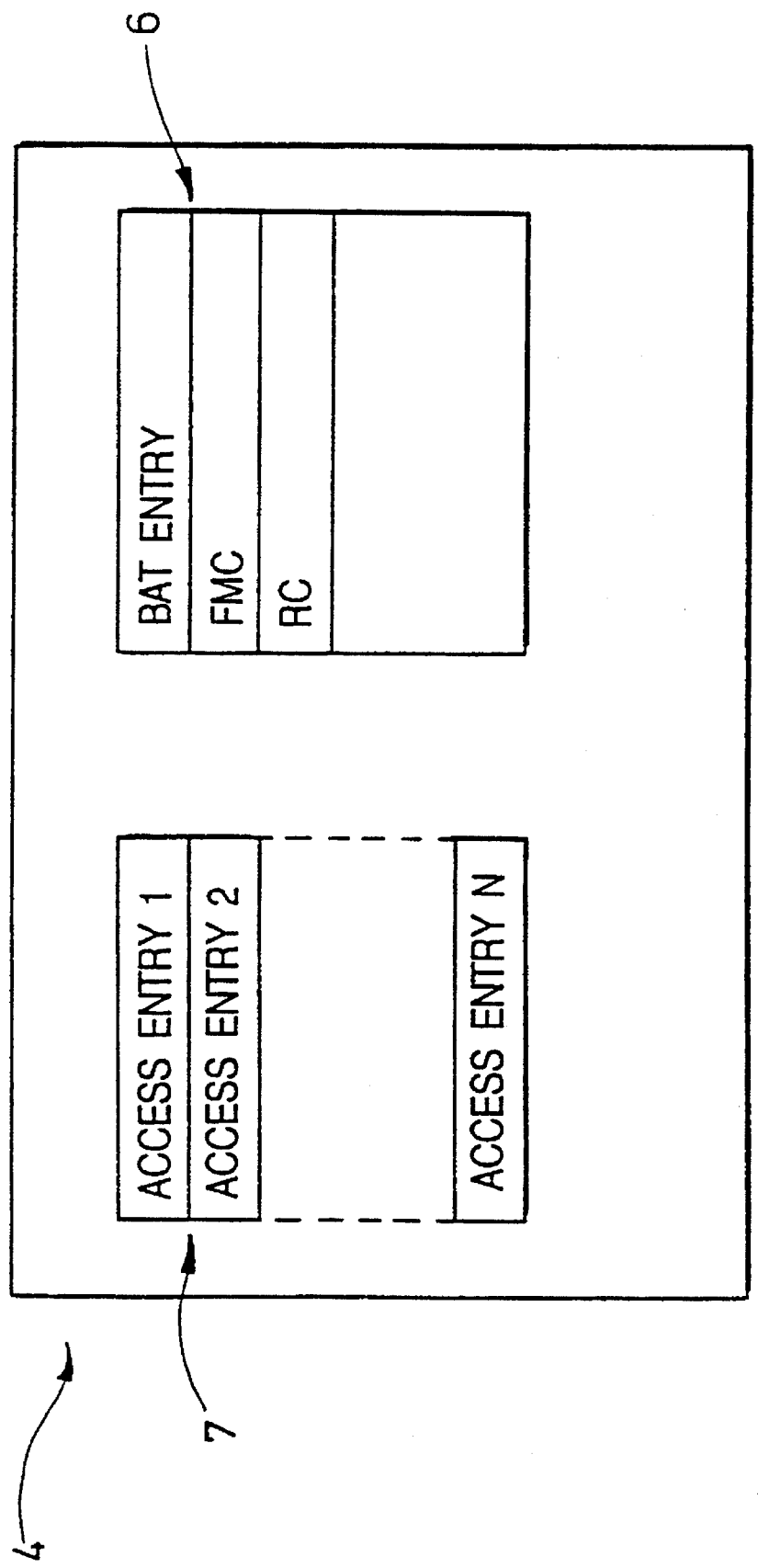
Figure 5:
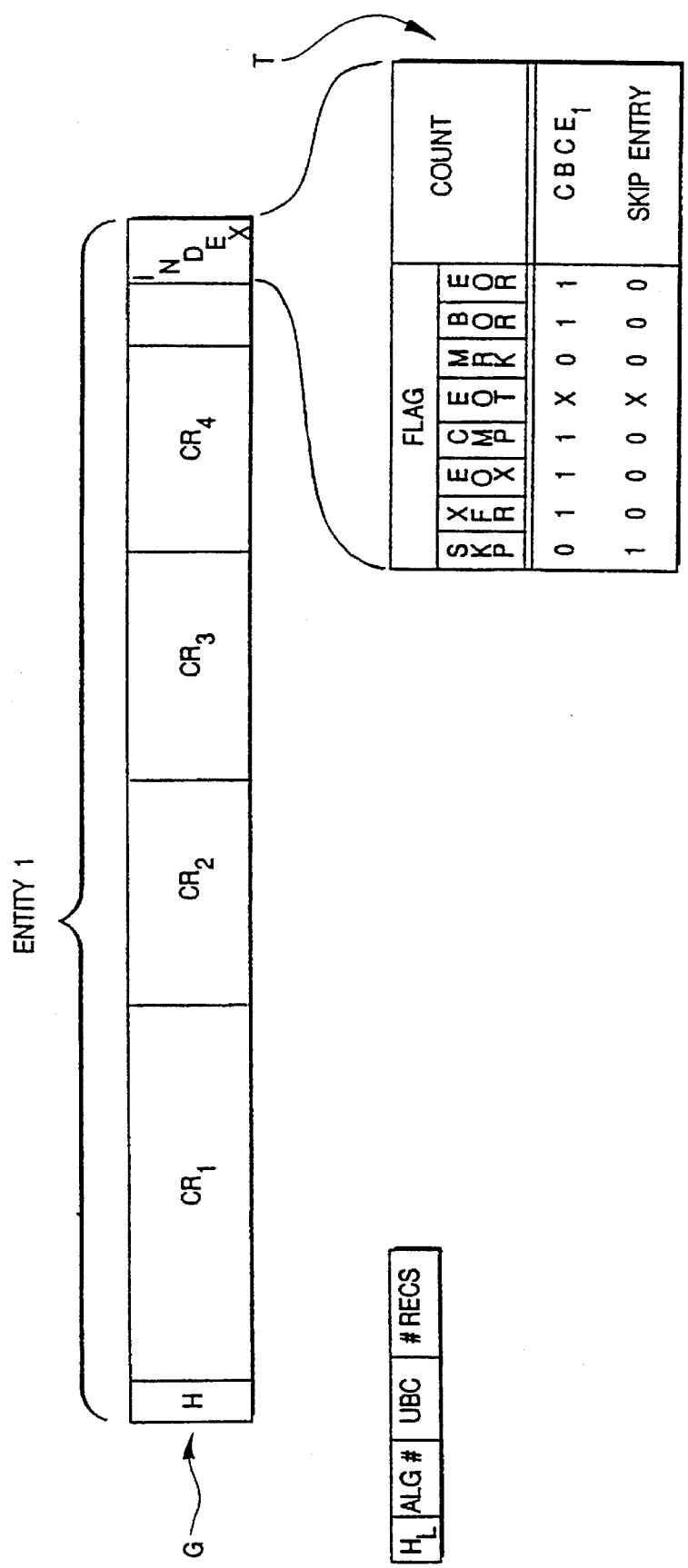
Figure 6:
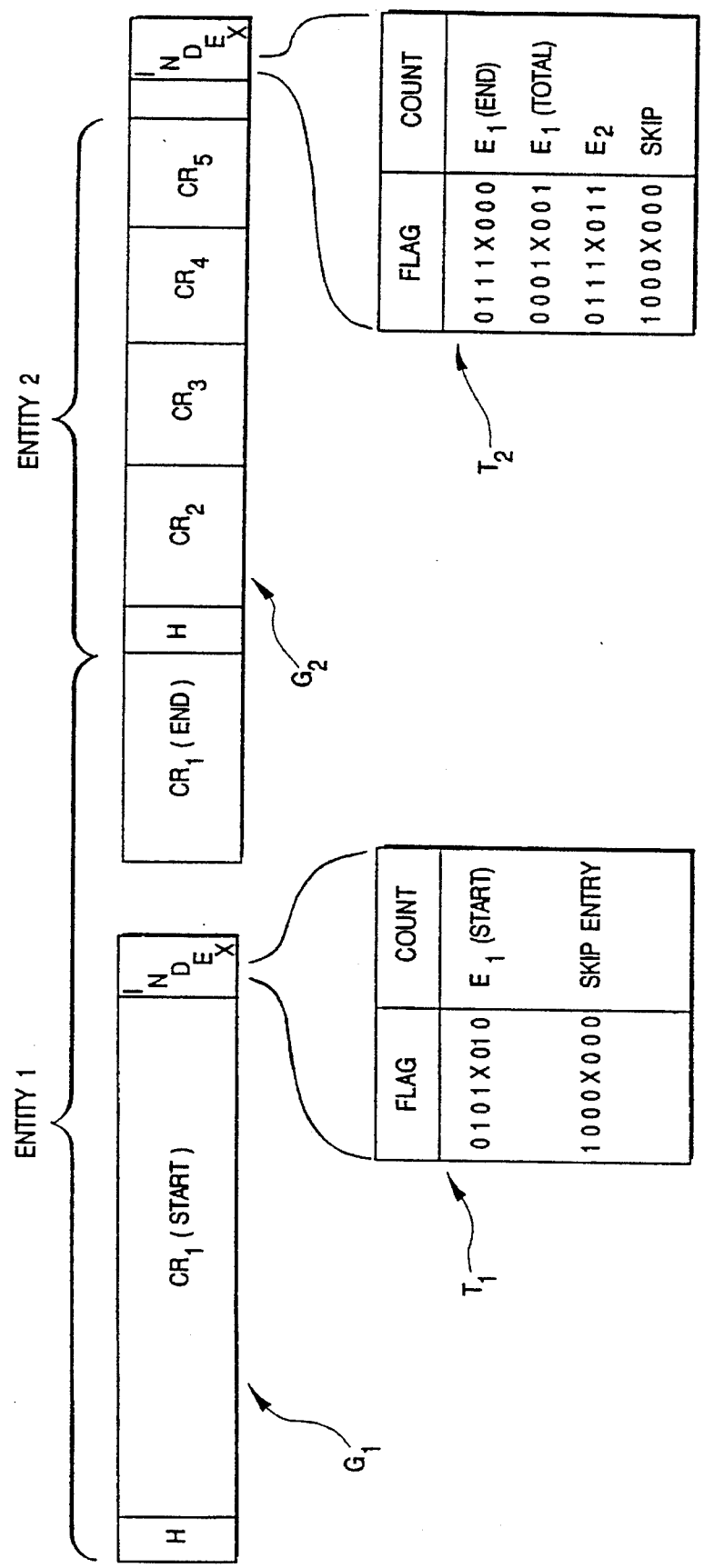
Figure 7:
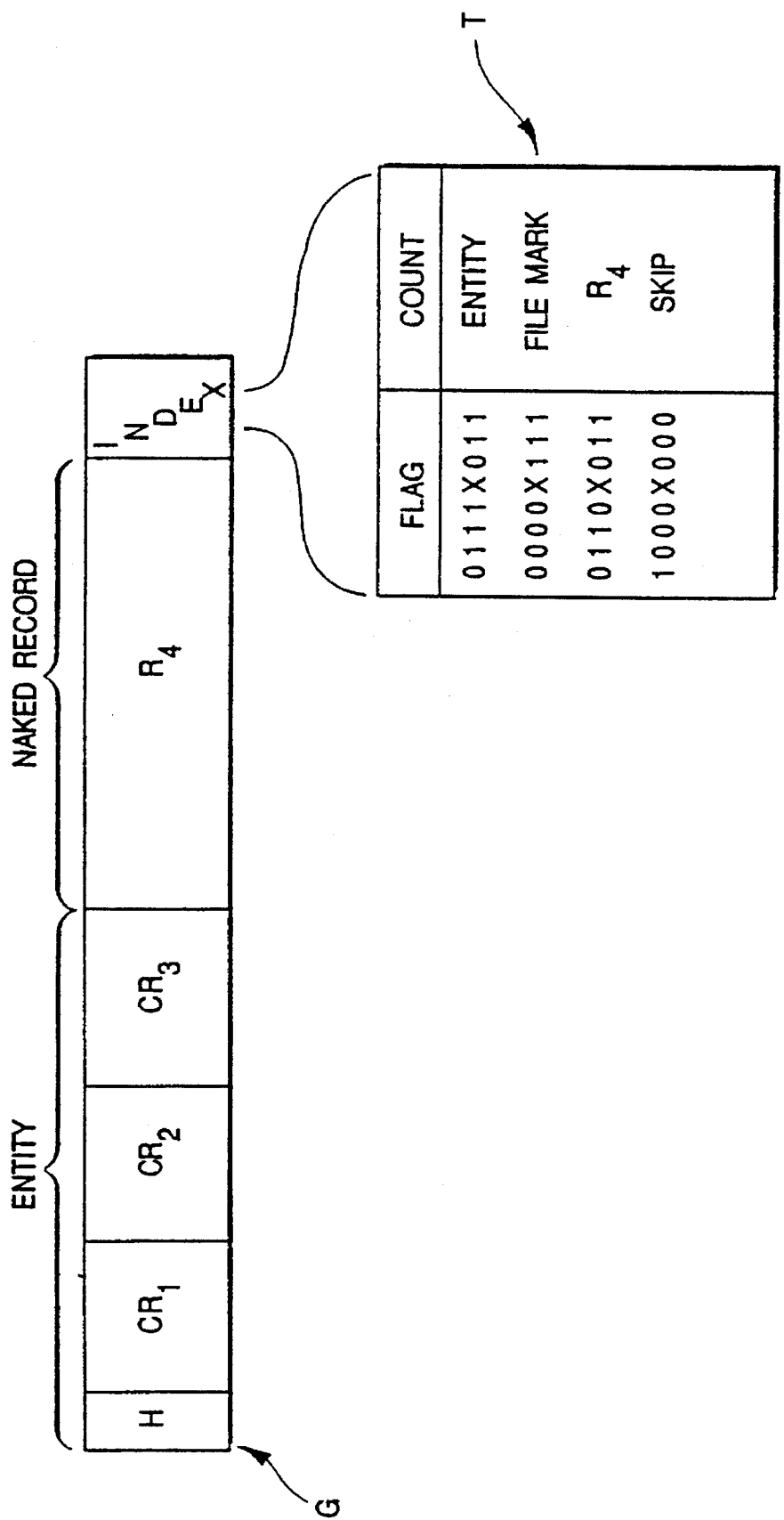
Figure 8:
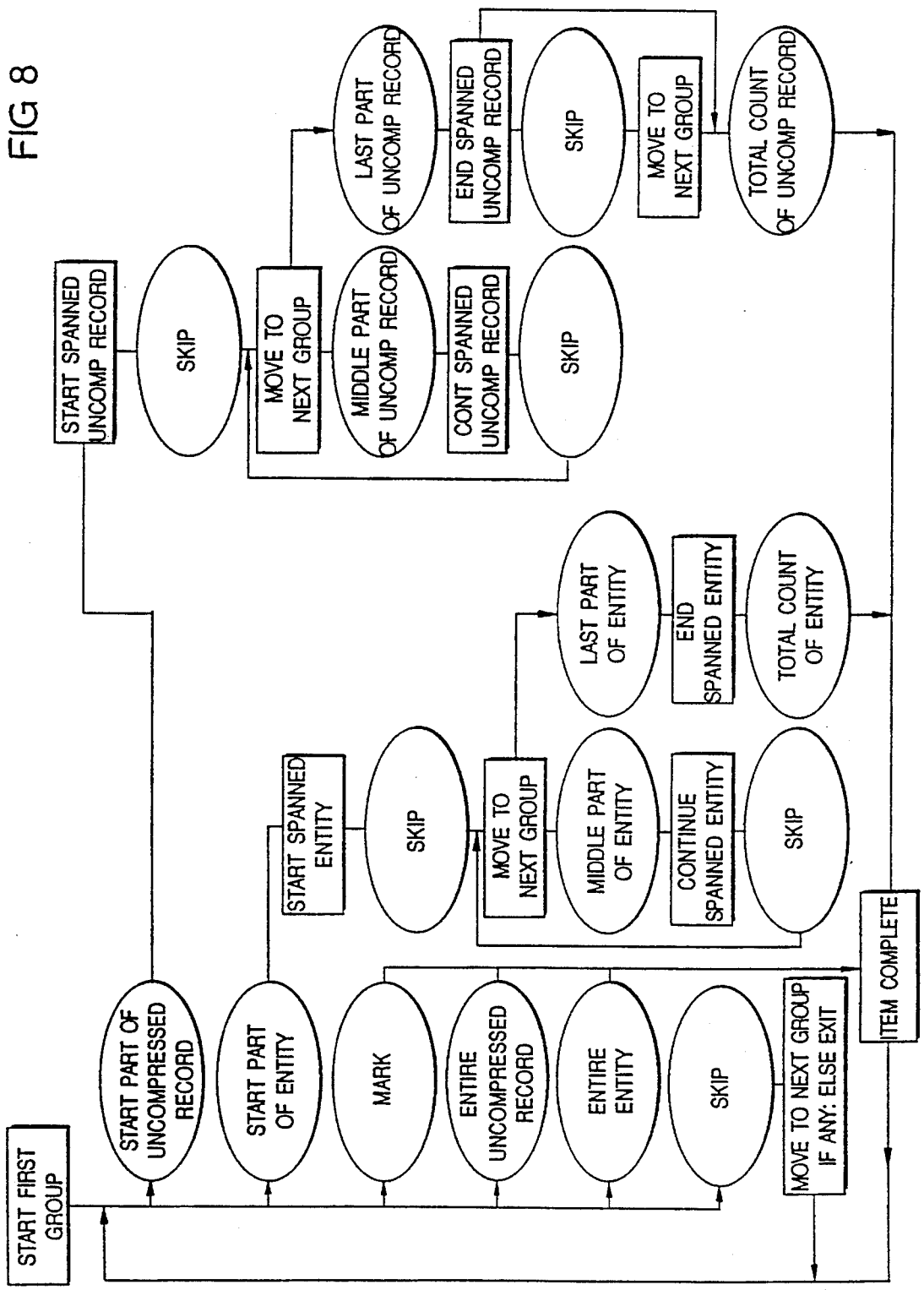

(a) is a diagram representing a sequence of data records and logical separation marks sent by a user (host) to data storage apparatus;

(b) and (c) are diagrams illustrating two different arrangements for storing the sequence of FIG. 1(a) on tape;

FIG. 2 is a diagram of a group index;

FIG. 3 is a diagram of a general block access table;

FIG. 4 is a diagram of a specific block access table;

FIGS. 5–7 are diagrams of further schemes for storing computer data;

FIG. 8 is a diagram illustrating possible valid entries for the block access table of a group.

Figure 9:
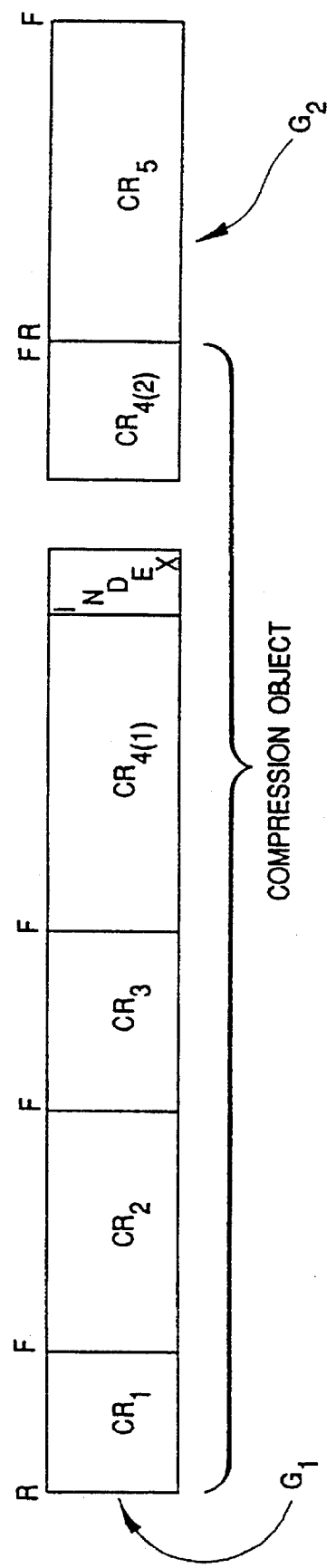
Figure 10:
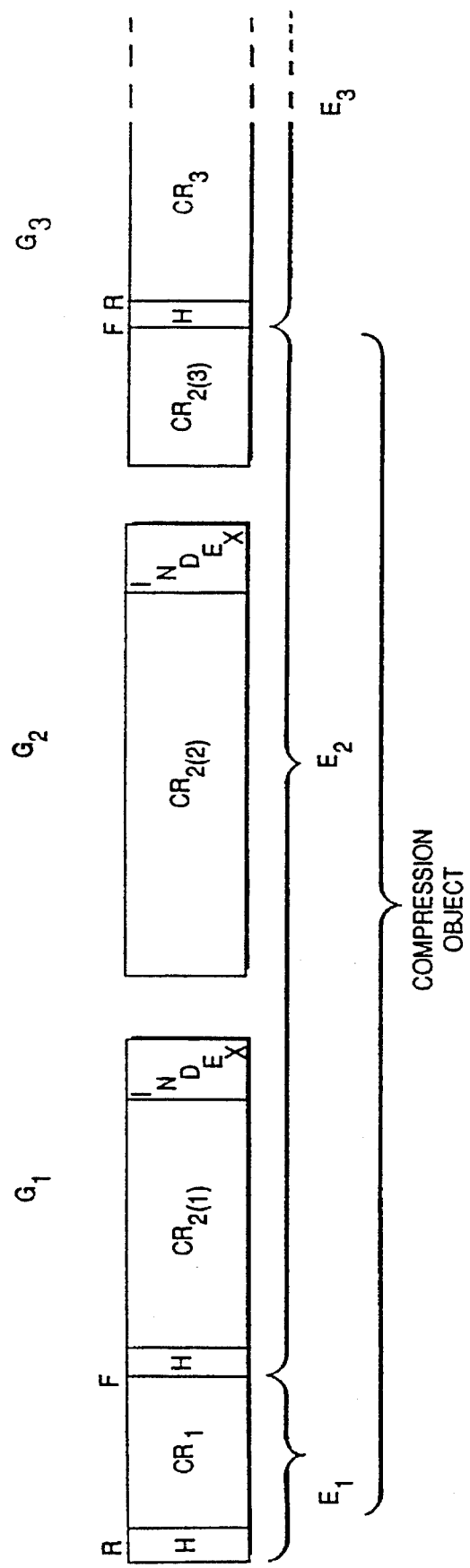
Figure 11:
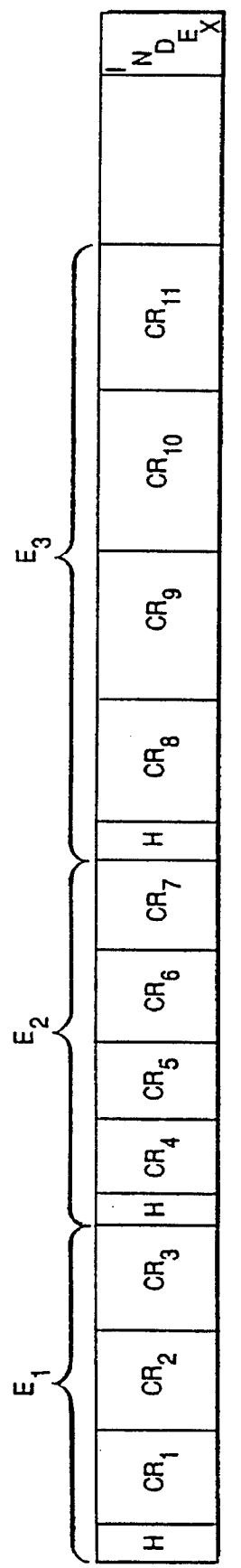
Figure 14:
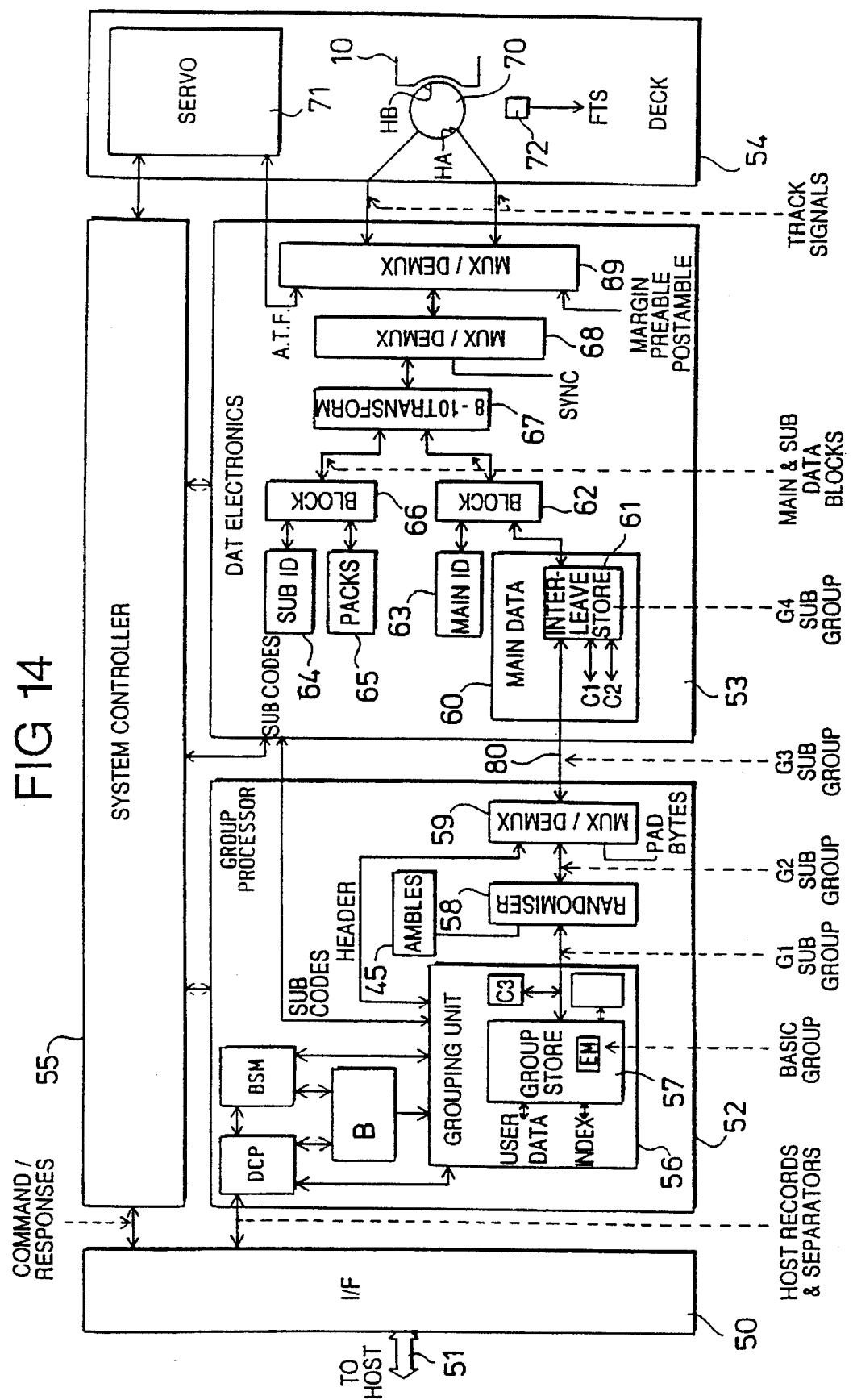
Figure 15:
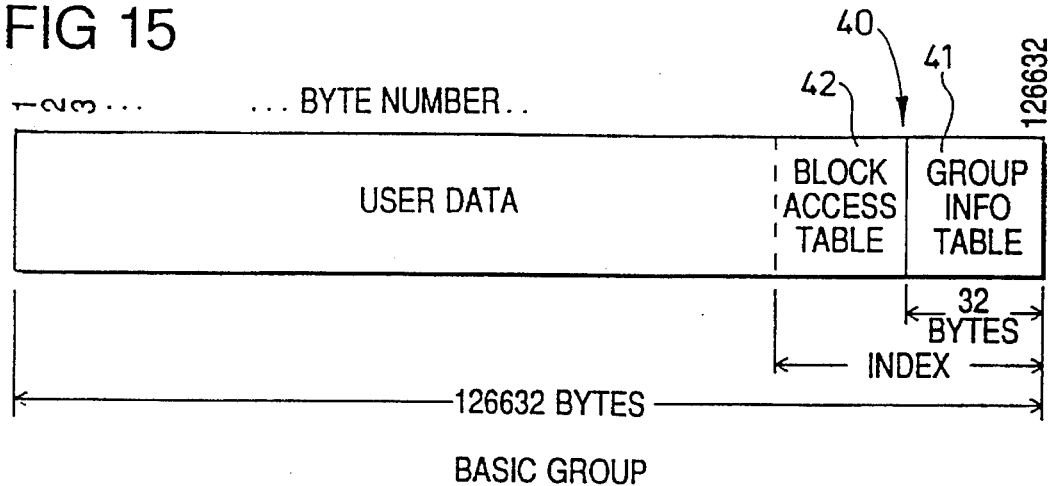
Figure 16:
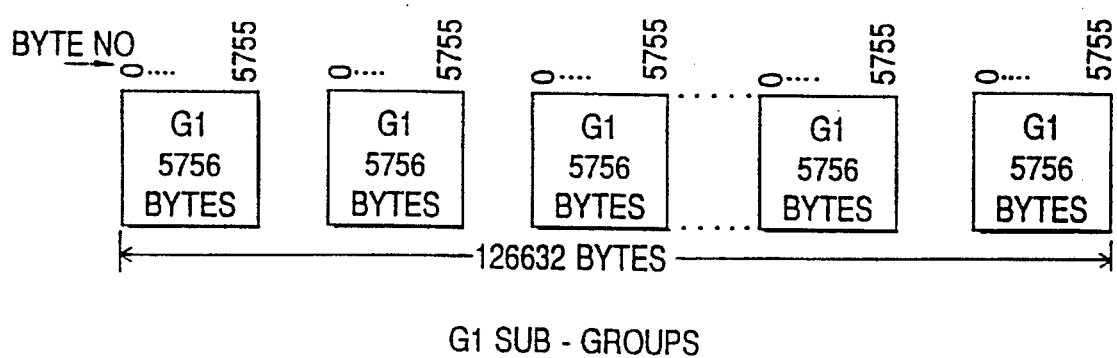
Figure 17:
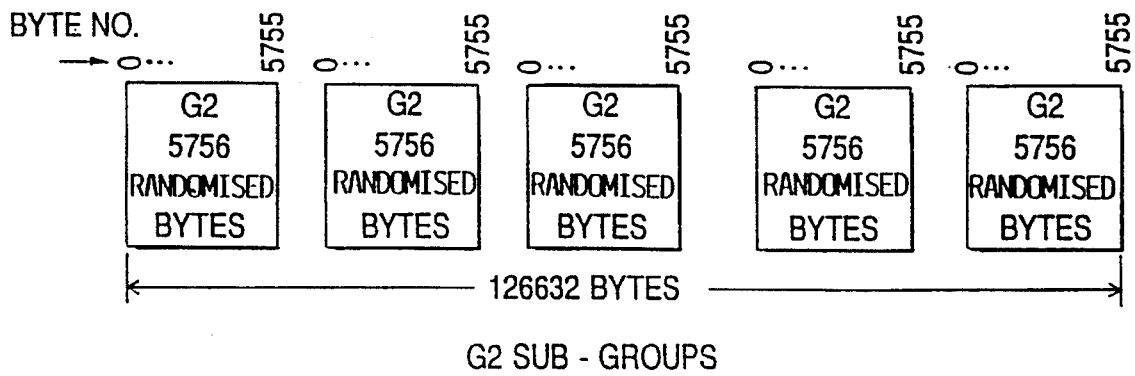
Figure 20:
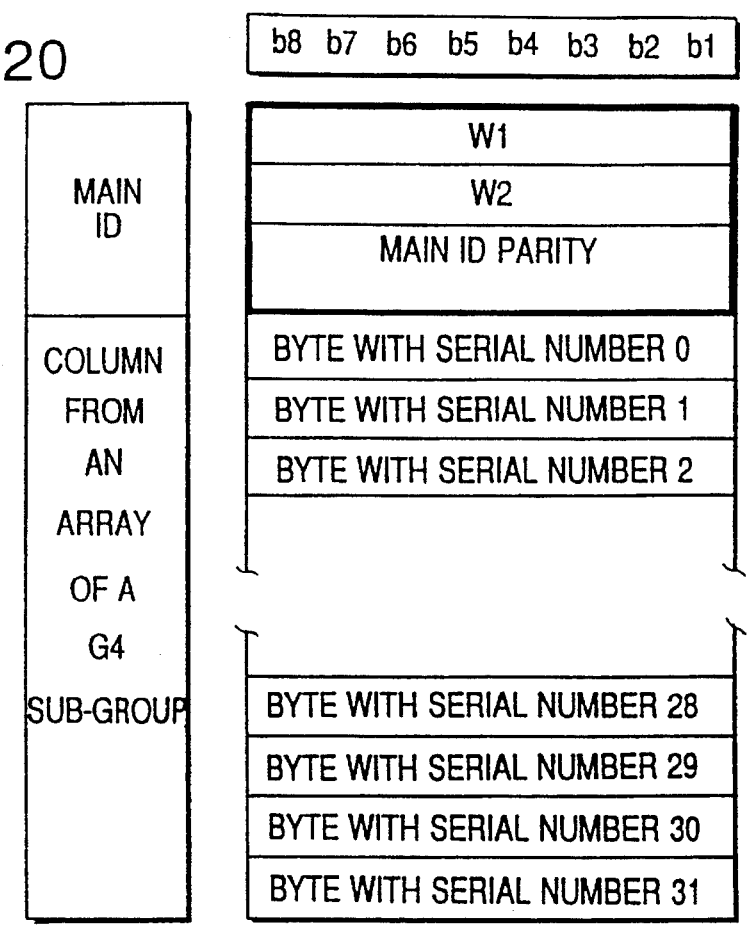
Figure 21:
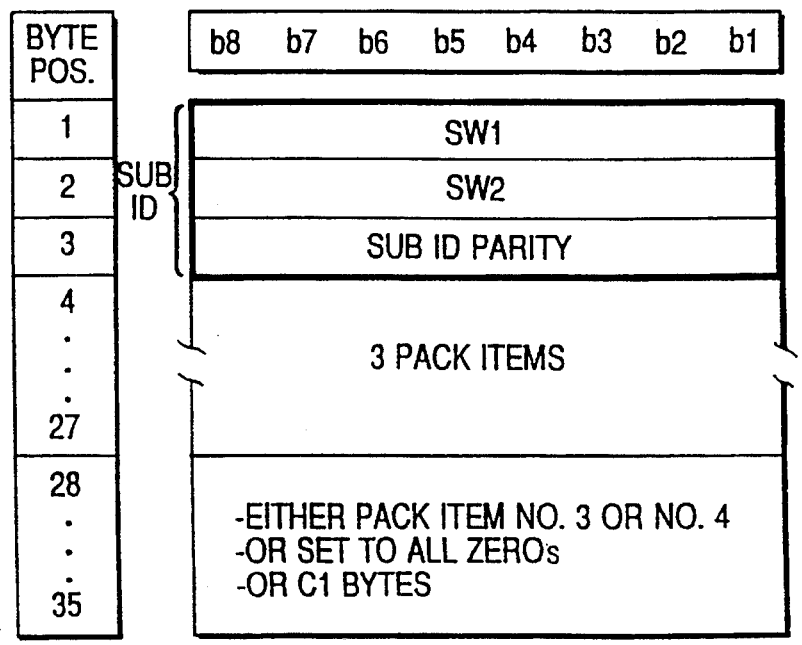

FIGS. 9–11 are further diagrams of scheme for storing computer data;

FIG. 12 illustrates the format of a frame written to tape in accordance with the DAT format specification;

FIG. 13A shows the layout of a tape written according to the DDS format;

FIG. 13B shows the composition of a recorded data group written in a data area of the tape layout of FIG. 13A;

FIG. 14 is a block diagram of a tape storage device arranged to implement the DDS format;

FIG. 15 illustrates a basic group produced by a group processor of the FIG. 14 storage device;

FIG. 16 illustrates G1 sub-groups produced by the group processor of the FIG. 14 storage device;

FIG. 17 illustrates G2 sub-groups produced by the group processor of the FIG. 14 storage device;

FIG. 18 illustrates the composition of a G3 sub-group transferred between the group processor and DAT electronics of the FIG. 14 storage device;

FIG. 19 illustrates one array of twin arrays that form a G4 sub-group produced by the DAT electronics of the FIG. 14 storage device;

FIG. 20 illustrates the composition of a main data block produced by the DAT electronics of the FIG. 14 storage device;

FIG. 21 illustrates the composition of a sub data block produced by the DAT electronics of the FIG. 14 storage device;

FIG. 22 shows the format of track signals transferred between the DAT electronics and a DAT deck of the FIG. 14 storage device;

FIGS. 23–26 are flow diagrams relating to an append operation carried out in accordance with the present invention.

DETAILED DESCRIPTION OF THE INVENTION

Before describing a specific embodiment of the present invention, further information regarding data compression, including details of specific DC algorithms will first be given.

The aim of a data compression process is to remove redundancy from data. One measure of compression efficiency is called "compression ratio" and is defined as:

Length of uncompressed input

Length of compressed output

This is a measure of the success of a data compression process. The larger the compression ratio, the greater the compression efficiency.

One way of performing data compression is by recognising and encoding patterns of input characters, ie. a substitutional method.

According to the LZW algorithm, as unique strings of input characters are found, they are entered into a dictionary and assigned numeric values. The dictionary is formed dynamically as the data is being compressed and is reconstructed from the data during decompression. Once a dictionary entry exists, subsequent occurrences of that entry within the datastream can be replaced by the numeric value or codeword. It should be noted that this algorithm is not limited to compressing ASCII text data. Its principles apply equally well to binary files, data bases, imaging data, and so on.

Each dictionary entry consists of two items: (1) a unique string of data bytes that the algorithm has found within the data, and (2) a codeword that represents this combination of bytes. The dictionary can contain up to 4096 entries. The first eight entries are reserved codewords that are used to flag and control specific conditions. The next 256 entries contain the byte values 0 through 255. Some of these 256 entries are therefore codewords for the ASCII text characters. The remaining locations are linked-list entries that point to other dictionary locations and eventually terminate by pointing at one of the byte values 0 through 255. Using this linked-list data structure, the possible byte combinations can be any-where from 2 bytes to 128 bytes long without requiring an excessively wide memory array to store them.

In a hardware implementation of the scheme, the dictionary is built and stored in a bank of random-access memory (RAM) that is 23 bits wide. Each memory address can contain a byte value in the lower 8 bits, a codeword or pointer representing an entry in the next 12 bits, and three condition flags in the upper 3 bits. The number of bits in the output byte stream used to represent a codeword ranges from 9 bits to 12 bits and corresponds to dictionary entries that range from 0 to 4095. During the dictionary building phase, until 512 entries are made into the dictionary 9-bits are used for each codeword, after the 512th entry 10-bits are needed for the codewords, after the 1024th entry 11-bits are needed for the codewords, and for the final 2048 entries 12-bits are needed for the codewords. Once the dictionary is full, no further entries are built, and all subsequent codewords are 12 bits in length. The memory address for a given dictionary entry is determined by a complex operation performed on the entry value. Since the dictionary can contain 4096 entries, it would appear that 4K bytes of RAM is all that is needed to support a full dictionary. This is in fact the case during decompression. However, during compression, more than 4K bytes of RAM is needed because of dictionary "collisions" that occur during the dictionary building phase. This is when two different string character combinations map to the same location in the dictionary RAM and is a consequence of the finite resources in dictionary RAM and the complex process of dictionary building during compression. When a dictionary collision occurs, the two colliding values are recalculated to two new locations and the original location is flagged as a collision site.

An important property of the algorithm is the coupling between compression and decompression. These two operations are tied together both in the compression and decompression processes and in the packing and unpacking of codewords into a byte stream. The nature of the compression algorithm requires that the compression process and the decompression process be synchronized. Stated differently, decompression cannot begin at an arbitrary point in the compressed data. It begins at the point where the dictionary is known to be empty or reset. This coupling provides one of the fundamental advantages of the algorithm, namely that the dictionary is embedded in the codewords and does not need to be transferred with the compressed data. Similarly, the packing and unpacking process must be synchronized. Note that compressed data must be presented to the decompression hardware in the proper order.

Another approach to data compression is to reference a chosen amount of the most recent uncompressed datastream (termed a 'history buffer' or 'sliding window' or 'sliding dictionary') and to replace items in the incoming datastream which appear in the history buffer with codewords/tokens indicating where in the history buffer they are located. This approach is known as the first Lempel Ziv algorithm or LZ1. During decompression, a history buffer is also referenced and as codewords/tokens are encountered the relevant strings from the history buffer are replaced to reconstruct the original datastream.

In this approach, a RESET command has the effect of clearing the history buffer and a FLUSH command has the effect of clearing the lookahead buffer.

Known methods for the storage of data, both compressed and uncompressed, will now be described.

The supply of the data from a user (host computer) to a tape storage apparatus will generally be accompanied by user separation of the data, whether this separation is the physical separation of the data into discrete packages (records) passed to the storage apparatus, or some higher level conceptual organisation of the records which is expressed to the storage apparatus by the host in terms of specific signals. This user-separation of data will have some particular significance to the host (though this significance will generally be unknown to the tape storage device). It is therefore appropriate to consider user separation as a logical segmentation even though its presence may be expressed to the storage apparatus through the physical separation of the incoming data.

FIG. 1(a) illustrates a sequence of user data and special separation signals that an existing type of host might supply to a tape storage apparatus. In this example, data is supplied in variable-length records R1 to R9; the logical significance of this physical separation is known to the host but not to the storage apparatus. In addition to the physical separation, user separation information is supplied in the form of special "file mark" signals FM. The file marks FM are provided to the storage apparatus between data records; again, the significance of this separation is unknown to the storage apparatus. The physical separation into records provides a first level of separation while the file marks provide a second level forming a hierarchy with the first level.

FIG. 1(b) shows one possible physical organisation for storing the user data and user separation information of FIG. 1(a) on a tape 10, this organisation being in accordance with a known data storage method. The mapping between FIG. 1(a) and 1(b) is straightforward—file marks FM are recorded as fixed-frequency bursts 1 but are otherwise treated as data records, with the records R1–R9 and the file marks FM being separated from each other by inter-block gaps 2 where no signal is recorded. The interblock gaps 2 effectively serve as first-level separation marks enabling the separation of the stored data into the user-understood logical unit of a record; the file marks FM (fixed frequency burst 1) form second-level separation marks dividing the records into logical collections of records.

FIG. 1(c) shows a second possible organisation which is known for storing the user data and user separation information of FIG. 1(a) on tape 10. In this case, the user data is organized into fixed-size groups 3 each including an index 4 for containing information about the contents of the group. The boundary between two groups 3 may be indicated by a fixed frequency burst 5. The division of data into groups is purely for the convenience of the storage apparatus concerned and should be transparent to the host. The user data within a group is not physically separated in any way and each record simply continues straight on from the end of the preceding one; all information regarding separation of the data in a group both into records and into the collection of records delimited by file marks is contained in the index of the group. In the present example, records R1 to R8 and the first part of R9 are held in the illustrated group 3.

The length of the index 4 will generally vary according to the number of separation marks present and the number of records in the group; however, by recording the index length in a predetermined location in the index with respect to the group ends, the boundary between the index and the last byte can be identified. A space with undefined contents, eg. padding, may exist between the end of the data area and the first byte of the index.

The contents of the index 4 are shown in FIG. 2 and, as can be seen, the index comprises two main data structures, namely a group information table 6 and a block access table 7. The number of entries in the block access table 7 is stored in a block access table entry (BAT ENTRY) count field in the group information table 6. The group information table 6 also contains various counts, such as a file mark count FMC (the number of file marks written since a beginning of recording (BOR) mark including any contained in the current group) and record counts RC (to be defined).

The block access table 7 describes by way of a series of access entries, the contents of a group and, in particular, the logical segmentation of the user data held in the group (that is, it holds entries indicative of each record boundary and separator mark in the group). The access entries proceed in order of the contents of the group.

Referring to FIG. 3, the entries in the block access table each comprise a FLAG entry indicating the type of the entry and a COUNT entry indicating its value. The FLAG field is 8 bits and the COUNT field is 24 bits. The bits in the FLAG field have the following significance:

| | |
|---|---|
| SKP | A SKIP bit which, when set, indicates a "skip entry". A skip entry gives the number of bytes in the group which is not taken up by user data ie. the size of the group minus the size of the user data area. |
| XFR | A DATA TRANSFER bit which, when set, indicates the writing to tape of user data. |
| EOX | An END OF DATA TRANSFER bit which, when set, indicates the end of writing a user data record to tape. |
| CMP | A COMPRESSION bit which, when set, indicates that the entry relates to compressed data. |
| EOT | The value of this bit does not matter for the purposes of this description. |
| MRK | A SEPARATOR MARK bit which, when set, indicates that the entry relates to a separator mark rather than to a data record. |
| BOR | A BEGINNING OF RECORD bit which, when set, indicates the location of the beginning of a data record. |
| EOR | An END OF RECORD bit which, when set, indicates the location of the end of a data record on tape. |

FIG. 3 illustrates the seven types of entry which can be made in the block access table. The SEPARATOR MARK entry has the BOR and EOR bit set because it is treated by the drive as a record. The next four entries each have the XFR bit set because they represent information about data transfers. The START PART OF RECORD entry relates to a case where only the beginning of a record fits into the group and the next part of the record runs over to the following group. The only bit set in the MIDDLE PART OF RECORD entry flag is the data transfer bit because there will not be a beginning or end of a record in that group. The END PART OF RECORD entry does not have the EOR bit set in the FLAG—instead, the EOR bit is set in the TOTAL COUNT entry which gives the total record byte count. The last entry in the block access table for a group is always a SKIP entry which gives the amount of space in the group which is not taken up by user data ie. the entry in the Count field for the SKIP entry equals the group size (eg. 126632 bytes) minus the data area size.

An example of a block access table for the group 3 of records shown in FIG. 1(c) is shown in FIG. 4. The count entries for records R1–8 are the full byte counts for those records whereas the count entry for record R9 is the byte count of the part of R9 which is in the group 3. The count entries for the file marks FM will be 0 or 1 according to the format. The count entry for the SKIP entry is 126632 minus the sum of the byte counts appearing previously in the table (not including Total Count entries).

FIG. 5 shows another possible organisation for storing user data and related information on tape. Again, the user data is organised into fixed size groups each group including an index which is uncompressed even if the group contains compressed data comprising a block access table for containing information about the contents of the group. The boundaries between groups may be indicated by fixed frequency bursts.

However, rather than storing information in the group index solely in terms of records, this embodiment involves storing the information about the contents of the group in terms of "entities", where an entity comprises one or more records. In this embodiment, an entity can contain n compressed records each having the same uncompressed length, where n is $\geq 1$.

In FIG. 5, a group G comprises a single entity ENTITY 1 (or $E_1$) which comprises four complete records $CR_1$–$CR_4$ of compressed data and a header portion H of 8 bytes. The records $CR_1$–$CR_4$ have the same uncompressed length but are likely to be of different length after undergoing data compression.

The header portion H, which remains uncompressed, in the datastream contains the following information:

| | |
|---|---|
| HL | The header length (4 bits). (The next 4 bits are reserved). |
| ALG# | A recognised number denoting the compression algorithm being used to compress data (1 byte). |
| UBC | The uncompressed byte count for the records in the entity (3 bytes). |
| #RECS | The number of records in the entity (3 bytes). |

The advantage of including the length of the header portion in the header is that it enables this length to be varied whilst still allowing a drive to skip over the header if desired.

Information is recorded in a block access table T in the index of each group in terms of entities rather than in terms of records but otherwise as previously described with reference to FIGS. 2–4. The entries in the block access table for the entity $E_1$, are also shown in FIG. 5.

The types of entries which are made in the block access table T are similar to those described with reference to FIG. 2–4. The difference is that, now setting of the CMP bit in the FLAG field indicates that the entry relates to a byte count for an entity rather than for a record.

One possibility is to allow entities to contain only compressed records and this is preferred. This then means that the setting of the CMP bit in the FLAG field still indicates that the COUNT entry is a compressed byte count. However, another possibility is to allow entities to contain either compressed data or uncompressed data and to reserve a particular algorithm number eg. all zeros, to indicate that the data in an entity is uncompressed.

Storing information in the block access table T in terms of entities rather than records reduces the storage management overhead associated with writing and reading the records to and from tape. Whereas, using the scheme shown in FIGS. 2 to 4, five entries in the block access table would be required for the group G, only two entries are now needed.

The organisation of records into entities facilitates the transfer of multiple records of identical uncompressed size because it reduces the degree of processor intervention which is required during reading and writing. To write a sequence of records contained in an entity only requires processor intervention to form the header portion and to make the appropriate entry in the block access table. In contrast, using the known scheme described with reference to FIGS. 1 to 4 requires processor intervention on a per record basis. This is especially important with data compression, since the compressed byte count is unknown until after the compression process has finished. Thus, when trying to fill up a group with data, the number of records (and corresponding block access table entries) that will fit is unknown. By fixing the block access table requirements at one entry no matter how many records worth of data fit into the group, the entire group may be filled up with a single processor intervention. Similar advantages are afforded when reading data.

With reference to FIG. 6, an entity ($E_n$) may spread over more than one group eg. an entity $E_1$ containing a single, relatively long record $CR_1$ fills group $G_1$ and runs over into group $G_2$. The entries in the block access tables $T_1$, $T_2$ of the groups $G_1$, $G_2$ are also shown in FIG. 6. To reduce the degree of linkage between groups, a new entity is started as soon as possible in a group ie. at the start of the group or at the beginning of the first compressed record in the group if the previous record is uncompressed or the previous record is compressed and has run over from the previous group. Therefore, at the end of compressed record $CR_1$, the next entity, $E_2$ begins. Entity $E_2$ contains four compressed records $CR_2$ to $CR_5$ of equal uncompressed length.

It is envisaged that groups may contain a mixture of entities containing compressed data and "naked records" containing uncompressed data. An example of this arrangement is shown in FIG. 7 which also shows the corresponding entries in the block access table.

A group G contains an entity comprising a header portion H and three compressed records $CR_1$, $CR_2$ and $CR_3$. The group G also comprises an uncompressed record $R_4$ (which has no header portion). The block access table T of the group G contains four entries:

the first entry is the full byte count of the entity in the group;

the second entry is a file mark entry (which indicates the presence of a file mark in the incoming data before the start of record $R_4$);

the third entry is the full byte count of the uncompressed record $R_4$;

the last entry is a SKIP entry.

It will be noted from FIG. 7 that the CMP bit (the fourth bit of the FLAG field) is set for the entity byte count entry but not for the naked record byte count entry. A suitably configured non-DC drive can identify compressed and uncompressed data on a tape having a mixture of such data by checking whether the CMP bit is set in the relevant block access table entries.

In this scheme, no separator marks are allowed within an entity. For example, if a host is sending a sequence of equal length records to a DC tape drive and there is a file mark or other separator mark within that sequence, then the first set of records before the separator mark will be placed in one entity, the separator mark will be written to tape and the set of records in the sequence which follow the file mark will be placed in a second entity. The corresponding entries for the two entities and the separator mark will of course be made in the block access table of the relevant group (assuming that only one group is involved in this example).

The possible valid sequences of entries in the block access table of a group are illustrated in FIG. 8. In FIG. 8, states and actions are designated by rectangles and block access table entries are designated by ellipses. A 'spanned' record/entity is one which extends over from one group into another.

To take account of the existence of entities and the permitted existence of multiple compressed records within an entity, certain fields in the group information table in the index of each group are defined as follows:

Record Count—this field is a 4-byte field which specifies the sum of the values of the Number of Records in Current Group entry (see below) of the group information table of all groups written since BOR, up to and including the current group.

Number of Records in Current Group—this field is a 2-byte field which specifies the sum of the following:

i) the number of Separator Mark entries in the block access table of the current group.

ii) the number of Total Count of uncompressed record entries in the block access table of the current group.

iii) the number of Full Count uncompressed record entries in the block access table of the current group.

iv) the sum of the numbers of compressed records within all entities for which there is a Total Count of Entity entry or Full Count of Entity entry in the block access table of the current group.

v) the number, minus one, of compressed records in the entity for which there is a Start Part of Entity entry in the block access table of the current group, if such an entry exists.

vi) the number of Total Count of Entity entries in the block access table of the current group.

Group Number of the Previous Record—this field is a 2-byte field which specifies the running number of the highest-numbered previous group in which a separator mark, an access point or the beginning of an uncompressed record occurred. It shall contain all ZERO bits if no such previous group exists.

With regard to the organisation of records in fixed size groups as described with reference to FIGS. 1 to 8 it is generally desirable to keep the groups independent from one another for decompression purposes ie. it is generally desirable to RESET the dictionary at or near the beginning of each group. Two main reasons for this are to help reduce the amount of buffer space which is required in the controller by decreasing the linkages between groups ie. to make it less likely to have to store more than one group in the buffer at any one time. Another reason for a dictionary RESET at the beginning of a group is that, when it is desired selectively to decompress a record in the middle of a group it is not necessary to go outside the group to start the relevant dictionary.

There are advantages in having a FLUSH condition after each record—the FLUSH codeword is also called the "end of record" (EOR) codeword, so as to improve the access to compressed data. This feature enables records to be decompressed individually, subject to the need to decompress from the RESET point which precedes the record. Having a FLUSH condition at the end of each record means that the data for each record can be decompressed without running into the data from the next record. This feature is also useful when it is desired to append new records to a point in the middle of existing records.

The amount of compressed data which makes up a data dictionary is termed a "compression object". A compression object may encompass more than one group of data as illustrated in FIG. 9. Where a record overlaps from one group to the next, a RESET codeword is placed in the data stream at the beginning of the very next compressed record.

In FIG. 9 a Group $G_1$ comprises three full compressed records $CR_1$, $CR_2$, $CR_3$ and the first part of a fourth compressed record $CR_4$. The last part of record $CR_4$ extends into the next group $G_2$. The records are not organised into entities in this example.

During data compression, the dictionary is reset (indicated by R in FIG. 9) at the beginning of group $G_1$. FLUSH codewords (indicated by F) are inserted into the datastream at the end of each record. The current dictionary continues until record $CR_4$ ends at which time the dictionary is reset. Thus the current compression object comprises records $CR_1$–$CR_4$. The advantages of allowing a dictionary to extend over more than one record of unequal uncompressed length in terms of increased efficiency of data compression are therefore obtained.

If it is later desired selectively to decompress, say, record $CR_3$, this can be achieved by beginning decompression at the start of record $CR_1$ ie. the start of the compression object containing record $CR_3$, and decompressing data until the end of record $CR_3$. A 'clean break' at the end of record $CR_3$ can be achieved ie. without running over into the start of record $CR_4$ due to the FLUSH codeword at the end of record $CR_3$.

Thus, providing FLUSH codewords which are accessible by the format interspersed between 'access points' (RESET codewords accessible by the format) enables selective decompression of segments of data which are smaller than the amount of data used to build a dictionary during data compression. The FLUSH codewords at the end of records are accessible since the compressed byte counts for each record are stored in the block access table.

In the format, the start of a compression object which forms an 'access point' ie. a point at which the drive can start a decompression operation, may be denoted in one of several ways. Access points may be explicitly noted in the block access table of each group. Alternatively, the presence of an access point may be implied by another entry in the block access table eg. the very presence of an algorithm number entry may imply an access point at the beginning of the first new record in that group. Alternatively, a bit in the algorithm number may be reserved to indicate that a new dictionary starts at the beginning of the first new record in that group.

When records are organised into entities and entities are organised into groups as described with reference to FIGS. 5 to 7, a compression object may encompass more than one entity as illustrated in FIG. 10, so as to obtain the advantage of dictionary sharing over entities which contain relatively small amounts of data.

FIG. 10 shows three fixed size groups $G_1$, $G_2$, $G_3$ of compressed data. Group $G_1$ contains full record $CR_1$ and the first part of the next record $CR_2$. Record $CR_1$ is the only record in entity $E_1$. Group $G_2$ contains the middle part of record $CR_2$. Group $G_3$ contains the end part of record $CR_2$ and contains further records $CR_3$ etc. Entity $E_2$ contains a single, relatively long record $CR_2$.

During compression, the dictionary is reset (denoted by R) at the beginning of group $G_1$ but, since record $CR_1$ is relatively small, the compression object continues beyond record $CR_1$ and entity $E_1$ and includes record $CR_2$ and entity $E_2$. A compression object ends at the end of record $CR_2$ and a new one begins at the beginning of record $CR_3$.

The presence of a FLUSH codeword at the end of each entity which is accessible owing to writing the compressed byte count of the entity in the block access table enables selective decompression of records on a per entity basis. For example, referring to FIG. 10, the contents of entity $E_2$ (which happen to be a single record $CR_2$ in this example) could be decompressed without obtaining data from the beginning of record $CR_3$. However, decompression must commence from the RESET codeword at the beginning of entity $E_1$ which is the nearest previous dictionary start point which is accessible in the tape format. In this example there are not accessible FLUSH codewords at the end of each compressed record.

It would be possible for an entire tape to be written so that each compressed record had its own entity. This would improve access to records for selective decompression but involves the overhead of an 8 byte header per record and a 4 byte index entry per record. Also, then multiple record transfers would be slower since processor intervention is required to (at least) skip over the headers of each entity.

It should be appreciated that the DC processor inserts RESET codewords into the datastream in an algorithm-dependent manner—even in the middle of records. The above description relates to the RESET codewords which are forced, recognised and utilised by the tape format.

To clarify, in FIGS. 5 to 10 the entities and compression objects do not include the indices of any relevant group.

Regarding appending data to compressed data stored on tape, say to the end of the nth record in an entity $E_x$, it was previously necessary to locate the relevant entity $E_x$ and then, in order to locate the end of the nth record, to decompress the data in $E_x$ until the amount of decompressed data equalled n×the uncompressed byte count for that entity, storing the number of compressed bytes it was necessary to decompress in the process. That amount of data was then recompressed and the new data was appended to it. This procedure was time-consuming and problems arose if there was insufficient buffer space in the tape drive to store the n decompressed records.

A method of appending data to compressed records according to the present invention will now be described with reference to FIG. 11.

FIG. 11 depicts a group $G_1$ of compressed data comprising three entities: $E_1$, $E_2$ and $E_3$. Entity $E_1$ contains three compressed records $CR_1$–$CR_3$. Entity $E_2$ contains four compressed records $CR_4$–$CR_7$. Entity $E_3$ contains four compressed records $CR_8$–$CR_{11}$. Each entity has a header portion H as previously described.

If it is desired to append new data to the end of compressed record $CR_5$ in entity $E_2$, the number of records entry (# RECS) in the header portion H of $E_2$ is changed from 4 to 2. However, the compressed byte count entry for entity $E_2$ in the block access table of the group index is not changed. The new data is appended in a new entity after existing entity $E_2$ and the old records $CR_6$ and $CR_7$ are subsequently ignored although they remain on the tape. Due to changing the # RECS entry in the header portion H of the entity $E_2$, the Number of Records in Current Group entry in the group information table in the group index reflects the reduced number of wanted records in entity $E_2$ (as well as whatever new records are written to that group), and the Record Count entry changes accordingly.

Referring back to FIG. 5, if it is desired to append new data within an entity which is the last (or only) entity in a group, the # RECS entry in the entity header portion H is changed to reflect the new number of wanted records and the Number of Records in Current Group entry in the group information table is changed accordingly. The compressed byte count for the entity and the skip entry in the block access table of the group index remain unaltered. The new data is then written to a new entity at the beginning of a new group.

If it is desired to append data within an entity which spans more than one group, the # RECS entry in the entity header portion is changed to reflect the number of wanted records and the Number of Records in Current Group entry in the group information table is changed accordingly. The new data is written to a new entity at the beginning of the group which contained the end of the existing entity, ie, the end of the existing entity is overwritten. This is because, according to the DDS-DC Format, once an entity spans two groups, a new entity begins after the end of the current record. Therefore the spanning part of the entity must be the end of the last record in the entity and must be unwanted.

If it is desired to append new data to the end of the last record in an entity which is not the last entity in a group, no change to the entity header portion is required and the new data is written to a new entity starting after the existing entity in the group. The contents of the group information table in the group index are overwritten to reflect the new data in the group.

If it is desired to append new data to the end of the last record in an entity which is the last entity in a group, the new data will be written to a new entity at the beginning of a new group and no changes in the existing group will be required.

In all of the cases described above, a new data dictionary is started when compressing the new data to be appended.

If it is desired to append new data to the end of an uncompressed record, it is a simple matter to locate the point at which to begin the append operation because the uncompressed byte counts for individual records will be stored in the block access table of the group index. Alternatively, if uncompressed records are organised into entities, the end of the nth record in such an entity is n×the uncompressed byte count of the records in that entity (which are of equal length) from the beginning of the entity. The group index entries are overwritten to reflect the new data appended to the group.

If the data being appended is uncompressed data, it is written to a new naked record or a new entity as appropriate.

An implementation of the present invention is described below in relation to a tape storage device that stores and retrieves host computer data on tape generally in accordance with the DDS (Digital Data Storage) Format jointly developed by Hewlett-Packard Limited and Sony Corporation. A detailed description of the DDS format is given in the document "Digital Data Storage Format Description" (Revision B dated October 1988 available from Hewlett-Packard Limited, Bristol, England). The DDS format for the storage of computer data utilises and builds upon the 48 KHz mode of the DAT (Digital Audio Tape) format used for the storage of PCM audio data; a detailed description of the DAT format can be found in the document "DAT Conference Standard" (March 1988, Electronic Industries Association of Japan Tokyo, Japan). The DAT format and, accordingly, the DDS format, both employ a helical-scan recording technique in which tape storage medium is moved obliquely over a rotating head drum with a 90° wrap angle; the drum carries two read/write heads which write pairs of overlapping, opposite azimuth, tracks known as frames.

Tape storage devices implementing the DDS format are available, inter alia, from Hewlett-Packard Limited and are generally referred to as DDS drives.

The DDS format has been extended to cover the storage and retrieval of compressed data to provide the DDS-DC format. A detailed description of the DDS-DC format is given in the document entitled DDS-DC Format Specification No DDS-06 Revision A dated January 1990 available from Hewlett Packard Limited, Bristol, England. A tape storage device operable to compress and decompress data and to store data according to the DDS-DC format is known as a DDS-DC drive.

To facilitate an understanding of the present invention, a brief overview of the main features of the DDS-DC format will now be given following by a description of the main functional elements of a DDS-DC drive.

DDS-DC Format Overview

The basic unit for writing and reading information to/from a tape 10 is a frame. FIG. 12 illustrates the format of a frame which, as already mentioned, is made up of two opposite azimuth tracks 20, 21. In FIG. 12, the arrow T indicates the direction of tape movement. Each track comprises two marginal areas 22, two sub areas 23, two ATF (Automatic Track Following) areas 24 and a main area 25. The ATF areas 24 provide signals enabling the heads of the head drum (not shown) to accurately follow the tracks in known manner. The main area 25 is used to store the data (host data) provided to the tape device by the host computer (the host data comprises user data supplied as records by the host computer and separator marks that indicate logical separation of the user data). The sub areas 23 are primarily used to store auxiliary information known as sub codes that relate for example, to certain recording parameters (such as format identity, tape parameters etc), and tape usage history.

The general organisation of frames along a tape (that is, the tape layout) is illustrated in FIG. 13A. As can be seen, the tape is organised into three main areas, namely a lead-in area 36, a data area 37 and an end-of-data (EOD) area 38. The ends of the tape are referenced BOM (beginning of media) and EOM (end of media). Host data is recorded in the main areas of the frames written in the data area 37. The lead-in area 36 includes a system log area, between a beginning-of-recording (BOR) mark and the data area 37, where system information is stored. A tape Area ID sub code stored in the sub area 23 of each frame, enables the system log area, data area 37 and EOD area 38 to be distinguished from one another.

As shown in FIG. 13B, the frames 48 of the data area are arranged in recorded data groups 39 each of twenty two valid frames (plus an optional frame 43—the C3 ECC frame—storing error correction code for the group).

Within a group, user data is stored separately from separator marks and other information on the user data, the user data being stored as a continuous run of bytes across the main areas of successive frames without record markers, while information on the division of user data into records or entities and the separator marks are held in an index 40 that extends forwards from the end of the main area of the last frame in the group. (Note that the index will in fact be physically dispersed within the last frame due to a byte-interleaving process employed during recording after formation of the index.)

These recorded data groups are separated from each other by one or more amble frames 44 the main areas of which are filled with a randomised all-zeroes pattern. Ambles are only permitted in the data area 37.

Further details of the DDS-DC format will become apparent from the following description of a DDS-DC drive that implements the format.

DDS-DC Drive

FIG. 14 is a functional block diagram of a DDS-DC drive. The device comprises:

an interface unit 50 for interfacing the drive with a host computer (not shown) via a bus 51;

a group processor 52 for processing user data records and separator marks into and out of indexed groups and for compressing/decompressing data;

DAT electronics 53 which effects low-level signal processing, substantially as specified in the DAT standard, but with certain modifications as specified in the DDS format; this low-level processing serves to convert a byte stream supplied to it by the group processor 52 into track signals ready for recording and to reconvert track signals back into a byte stream for the group processor;

a helical-scan tape deck 54 for writing to and reading from a tape medium; and a system controller 55 for controlling the operation of the other elements of the drive in response to commands received from the host via the interface unit 50.

The drive is arranged to respond to commands from the host computer to load/unload a tape, to store a data record or separator mark, to search for selected separator marks or records, and to read back the next record and to compress/decompress data records.

The interface unit 50 is arranged to receive the commands from the computer and to manage the transfer of data records and separator marks between the tape storage device and computer. Upon receiving a command from the computer, the unit 50 passes it on to the system controller 55 which, in due course, will send a response back to the computer via the unit 50 indicating compliance or otherwise with the original command. Once the drive has been set up by the system controller 55 in response to a command from the computer to store or read data, the interface unit 50 will also control the passage of records and separator marks between the computer and group processor 52.

A description will now be given of the general operation of the drive in terms of the writing of data to tape; the operation of the drive during reading of data will be apparent to persons skilled in the art as processes are either simply reversed or data assembled during writing to aid the reading process is appropriately put to work during the latter (for example, error-correction codes calculated during writing are used during reading to correct errors).

During data storage the group processor 52 is arranged to compress the user-data if required and to organise the user-data that is provided to it in the form of data records, into data packages each corresponding to a group of data, termed a "basic group". The processor 52 is also arranged to construct the index for each group and the corresponding sub codes. During reading, the group processor effects a reverse process enabling data records and separation marks to be recovered from a group read from tape prior to decompression.

The unit 56 assembles each basic group in a group store 57. The form of a basic group is illustrated in FIG. 15 and, as can be seen, each basic group comprises 126632 bytes in all divided between user data (without any record marks) and an index 40 grown from the end of the basic group. The index 40 itself comprises two main data structures, namely a group information table 41 storing general information about the basic group (number of records, separator marks, etc), and a block access table 42 containing more specific data on the contents of the group (including information regarding the division of user data into records and entities and the logical location of separator marks). The group information table 41 is stored in a fixed location at the end of the group and is the same size (32 bytes) regardless of the contents of the basic group. In contrast, the block access table 42 varies in size depending on the contents of the group and extends from the group information table backwards into the remainder of the user data area of the frames of the group. Entries are made in the block access table from the group information table backwards to the boundary with user data.

The group store 57 is arranged to hold more than one (for example, two) group's worth of data. Overall control of the grouping process is effected by a unit 56 which also generates the group indices and associated codes during recording (functional block 61) and interprets these indices and sub codes during reading (functional block 62). The unit 56 is arranged to exchange coordination signals with the system controller 55.

A DC processor DCP is operable to compress data for storage on tape or to decompress data to be read by a host. There are interconnections between the DC processor DCP and a buffer B, a buffer space manager BSM and the grouping unit 56 for the interchange of control signals. The grouping unit 56 also comprises an entity manager (EM) which organises compressed data into entities and generates header portions for the entities.

During data writing when the host is ready to pass a data record, the interface 50 asks the grouping unit 56 whether it is ready to receive the record. The grouping unit 56 may initially send a "wait" reply but, in due course, enables the transfer of the data record from the host to the group store 57.

If the data is to be compressed (according to control signals from the system controller 55), the DC processor DCP substitutes codewords for a proportion of the data in the record in accordance with a data compression algorithm as previously described.

The insertion of accessible RESET and FLUSH codewords at particular points in the datastream can be programmed into the DC processor DCP if these can be specified in a simple manner eg. reset after each record. Alternatively, or as well, the insertion of RESET and FLUSH codewords according to the format can be governed by the system controller 55 eg. there can be FLUSH codewords automatically inserted at the end of each record and RESET codewords inserted according to signals from the system controller 55.

FIG. 14 can be termed an "inline" system, ie. where the DC processor DCP is placed between an interface 50 and a buffer B. During compression, data flows from the interface 50 through the DC processor into the buffer B. During decompression, data flows from the buffer B through the DC processor to the interface 50. There is no significant buffering between the interface 50 and the DC processor DCP.

If incoming data is not to be compressed, the data passes unchanged through the DC processor DCP and the entity manager EM is inactive. Uncompressed records are organised directly into groups without forming part of an entity and information regarding the records is put into the group index. Uncompressed records do not have a header portion created for them.

Typically, a host transfers records one at a time although multiple record transfers may be permitted for shorter records.

The records will be transferred to a group store location that corresponds to the eventual positioning of the record user data within the basic group of which it is to form a part. Information on the size of the record is used by the grouping unit 56 to update the group index. The index is constructed in a location in the group store appropriate to its position at the end of a basic group.

If a transfer from the host cannot all fit inside a basic group, it is said to "span" the group boundary. The first part of the transfer goes into one basic group and the rest into one or more subsequent basic groups. If no span occurs, the group index is updated and the grouping unit 56 waits for another write command. If a span occurs, the index of the current basic group is updated and that group is available for writing to tape. The next group is begun and the data from the host goes directly into the beginning of that new basic group. When the host sends a separator mark the grouping unit 56 will update the index of the current basic group accordingly.

The grouping unit 56 also generates certain sub-codes relevant to the current basic group such as the number of separator marks and records received counted from the first group.

For data which is being compressed, in parallel with organisation of the compressed data into groups, the entity manager EM generates an entity header portion for the current entity which will contain the compressed record data. The header portion is not compressed.

When a group becomes full, the processes of data compression and entity building halt until a new group is initiated. A new entity is started as soon as possible after the beginning of a group. Within a group, a current entity extends until the uncompressed size of records from the host changes in which case a new entity begins or until an uncompressed record or separation mark requires to be stored in which case the record is stored as a "naked record" or the separation mark is stored and the next entity begins when the next compressed record requires to be stored. As previously described with reference to FIGS. 5 to 7, once a 'span' occurs, the current record in the transfer may be completed but, after that, a new entity must be started.

During data writing, for all data, each basic group is transferred out of the group store in twenty two blocks each of 5756 bytes known as G1 sub-groups (see FIG. 16). Each such sub-group eventually forms the data contents of a respective recorded frame. Each G1 sub-group is allocated an identifying number known as the logical frame identification number (LF-ID) which the grouping unit 56 incorporates into a header. This header is subsequently combined into the main data stream along with the associated G1 sub-group (see below).

Optionally, the grouping unit may also calculate an error correction code (C3 code) block for each basic group. This C3 code forms its own G1 sub-group that is appended as a twenty third sub-group to the stream of sub-groups transferred out the grouping unit.

When data is being read from tape, the grouping unit 56 is arranged to receive G1 sub-groups and write them into the group store 57 in such a manner as to build up a basic group. The grouping unit 56 can then access the group index to recover information on the logical organisation (record/ entity structure, separator marks) of the user-data in the group. Using this information, the group processor 52 can pass a requested record or separator mark to the host via the interface 50. The assembly of G1 sub-groups back into a basic group is facilitated by the associated logical frame IDs provided to the grouping unit 56 in the headers stripped from the sub-groups earlier in the reading process.

Returning now to the description of the data writing process, the G1 sub-groups output from the grouping unit 56 are subject to a randomising process, of known form, in randomiser 58 in order to provide a consistent RF envelope on the read signal, independent of the data pattern in the frame. The output of the randomiser 58 is a succession of G2 sub-groups (see FIG. 17).

One or more amble sub-groups may optionally be added to the end of each group of G1 sub-groups fed to the randomiser 58, the control of amble addition being effected by an amble-control functional unit 45 of the group processor 52. These amble sub-groups are written to tape as amble frames. The contents of an amble sub-group are constituted by zero bytes which after processing (including randomising in randomiser 58) form the contents of the main area 25 of the corresponding amble frame, the only data in these main areas being a header associated with each amble. The main purpose of adding in amble sub-groups is to permit uninterrupted writing by the deck 54 if, for any reason, there is a delay in providing the next following group for writing to the deck. Thus, for example, if there is a delay in providing host data to the processor 52 to complete the next basic group, the unit 45 oversees the insertion of one or more amble sub-groups until such time as the processor 52 can complete the next basic group (or until a time-out has been reached and continuous writing is terminated, whereupon a repositioning operation must occur before the next group is written to tape). Any number of amble frames may be written to tape after a recorded data group.

The header associated with each amble sub-group is generated by the grouping unit 56 when the amble-control unit 45 determines that an amble sub-group is to be inserted. The logical frame ID of the header is set to zero to indicate that the sub-group is an amble sub-group and therefore may be ignored during reading when the sub-group is passed to the group processor 52. The sub codes to be recorded in the sub-areas of an amble frame are also provided by the grouping unit 56 and, in fact, comprise sub codes relevant to the last preceding group.

Following the randomiser 58, a multiplexer/demultiplexer 59 combines each G2 sub-group with its header and with a number of all-zero padding bytes needed to conform the size of each sub-group with the audio data frame size of the DAT format. The output of the mux/demux 59 is constituted by a succession of G3 sub-groups each of 5824 bytes conceptually arranged as illustrated in FIG. 18 (this arrangement and terminology matches the DAT format). More particularly, the bytes are arranged in rows of four as two 2-byte words, each word being labelled either a channel A word or a channel B word (reflecting the audio associations of the DAT format). The two words in the first row (numbered 0) are constituted by the sub-group header, the words in rows 1 to 1439 are derived from the corresponding G2 sub-group, and the words in rows 1440 to 1455 are the all-zero padding bytes.

As noted above, the header for each sub-group is generated by the grouping unit 56 and is provided in coordination with the output of the corresponding G1 sub-group. The structure of the header of each sub-group can be seen from FIG. 18. Again, as already noted, the header contains a Logical Frame ID (LF-ID); this ID is a one byte code stored in the upper byte position of both channels A and B. The first six bits of the LF-ID indicate the running number of each sub group within a group (1 to 23, the optional C3 frame being frame 23) or is set to zero for an amble frame. Bit seven of the LF-ID is set to ONE to indicate the last sub-group of a group (inclusive of any C3 sub-group). Bit eight of the LF-ID is set to ONE only for a C3 sub-group. In addition to the LF-ID, the header includes a four-bit data format ID (stored in the lower byte position of both channels A and B) which for the DDS format is set to 0000.

The G3 sub groups are passed to a main data processor 60 of the DAT electronics 53 where they are processed substantially in accordance with the 48 KHz mode of the DAT format. More particularly, the bytes of each G3 sub-group undergo an interleaving process to form twin arrays as they are fed into an interleave store 61 of the main data processor 60. This interleaving minimises the effects of certain media defects. Two sets of error correcting codes (C1 and C2) are then generated and inserted into the twin arrays held in store 61. FIG. 19 illustrates the conceptual form of one of these twin arrays that together constitute a G4 sub group. As can be seen from FIG. 19, each array of a G4 sub group is formed by 128 columns each of 32 bytes. After further processing in the DAT electronics 53, the two arrays of a G4 sub-group will form the contents of the main area of respective tracks of a frame.

Each array of a G4 sub-group is next formed into 128 main data blocks (see FIG. 20) each of 35 bytes by combining the 32 bytes of each array column with a three-byte Main ID in a block multiplexer/demultiplexer 62. The Main ID bytes are provided by a main ID unit 63 and are constituted by two bytes W1, W2 and a parity byte. Byte W1 contains format ID and frame number information and byte W2 contains a block number identifying the current main data block within the set of 128 blocks derived from each G4 sub-group array.

By the foregoing process, each basic group is transformed into 22 pairs of 128 main data blocks (that is 5632 main data blocks) with a further pair of 128 blocks for the C3 and each amble sub-group if present.

In parallel with the generation of the main data blocks, 35-byte sub-data blocks are also generated that contain sub codes supplied to the DAT electronics 53 from the group processor 52 and system controller 55. Thirty two sub-data blocks are generated for each G4 sub group processed (that is, 8 blocks for each of the two sub areas 23 of the two tracks into which the G4 sub group is to be written).

The structure of a sub-data block is illustrated in FIG. 21. Each sub data block comprises a three-byte "Sub ID" section 33 and a thirty-two byte "Sub Data" section.

The Sub ID is generated in a sub ID unit 64 and is composed of two information-containing bytes SW1, SW2 and a parity byte. Byte SW2 is used for storing information relating to the current sub data block as a whole (type and address) and the arrangement of the Sub Data section. Byte SW1 is used for storing sub codes and in particular, the Area ID indicating the current tape area (this sub code is supplied by the system controller 55).

The Sub Data section of each sub data block is generated in unit 65 and is composed of thirty two bytes arranged into four eight-byte "packs". Each pack is used to store a pack item; there are a number of different types of pack item each holding a particular set of sub codes. The mapping of pack items into the sub data packs is dependent on the current tape area and not all pack items will be present in any given tape area. The identity of the pack item held in a sub-data pack is indicated by a pack-item code that occupies the first half byte of each pack item stored in a pack. With regard to the fourth pack, for every even block this pack is either set to zero or contains the same pack item as the third pack, while every odd block the fourth pack contains a C1 parity byte for the first three packs of the current block and all four packs of the preceding even-numbered sub-data block.

By way of example, pack items coded 1 and 2 contain group, separator, and record counts while pack items 3 and 4 both contain area ID, absolute frame number, LF-ID and check sum data. Pack 3 of every odd sub data block contains pack item 3 while pack 3 of every even sub-data block contains pack item 4.

Certain of the sub code data stored in the packs are cumulative totals of events (such as number of groups) taken from BOR. This is made possible by storing historical data on such events in the packs of the system log area at the end of each tape usage session and then retrieving this data at the start of a new session.

The sub-ID bytes and the packs of the sub-data section are assembled into sub-data blocks by a sub-data block multiplexer/demultiplexer 66.

The final step in the writing process is to generate the track signals containing the main data blocks and sub data blocks. In order to avoid undesirable flux transitions, each 8-bit byte of the main data and sub-data blocks is transformed into a suitable 10-bit pattern, the resultant bits being termed "channel bits". This transformation is carried out by the 8–10 transformation unit 67 shown in FIG. 14.

After this transformation, a predetermined 10-channel-bit sync field is added to the front of each transformed main data and sub data block thereby forming 360-channel-bit blocks referred to as "recorded main data blocks" and "recorded sub data blocks" respectively. This operation is carried out by multiplexer/demultiplexer 68.

Finally, the recorded data blocks are combined with other types of 360-channel-bit recorded blocks (described below) in multiplexer/demultiplexer 69 to form track signals to be fed alternatively to the head HA and HB of the head drum 70 of the desk 54.

The sequence of recorded blocks does, of course, determine the format of each track (this format has already been described in general terms with reference to FIG. 12). A more detailed break down of the composition of each track in terms of recorded blocks is shown in FIG. 22. As can be seen, each track contains 196 recorded blocks with the 128 recorded main data blocks corresponding to one array of a G4 sub-group, being recorded between two groups of eight recorded sub data blocks. In addition to these recorded main data blocks and recorded sub data blocks, the following recorded block types are present:

Margin block, preamble blocks and postamble blocks (repeated channel bits pattern "111")

Spacer blocks (repeated channel bits pattern "100")

ATF blocks (predetermined frequency patterns).

The helical scan tape deck 54 is of standard form compliant with DAT specifications and will not be described in detail herein. The low-level control of the deck is effected by a servo unit 71 which itself is controlled by the system controller 55. The unit 71 also indicates beginning-of-media (BOM) and end-of-media (EOM) conditions to the controller 55. Included within the servo unit 71 is automatic track following (ATF) circuitry that, during writing, generates the ATF blocks and, during reading, utilises the ATF signals provided by the heads HA, HB to ensure proper alignment of the heads with the tracks recorded on the tape.

The deck 54 also has a pulse generator 72 arranged to generate a pulse output once every revolution of the head drum 70. This pulse output constitutes a frame timing signal FTS as each drum revolution corresponds to the reading/writing of one frame. The FTS signal is phased to mark the beginning of each frame and is used to synchronise the operation of the DAT Electronics and the transfer of data to/from the grouping unit 56, with the operation of the deck 54.

It will be appreciated that the foregoing description of the FIG. 14 drive has concentrated on the functional components of the drive rather than any particular implementation of this functionality. In practice, the processes of the group processor 52 and DAT electronics 53 can be implemented by respective controlling microprocessors with associated application-specific circuitry.

The functioning of the drive during the reading of data is substantially a reverse of the above described write operation but with certain of the auxiliary data assembled during writing being utilised to aid the reading process (for example, error correction codes, block addresses, logical-frame ID).

Furthermore, as well as normal-speed writing and reading, the drive will generally be provided with a fast search capability involving reading the sub areas of occasional frames to locate a desired record.

An append operation to be carried out in accordance with the present invention will now be described with reference to FIGS. 23–26.

Figure 23:
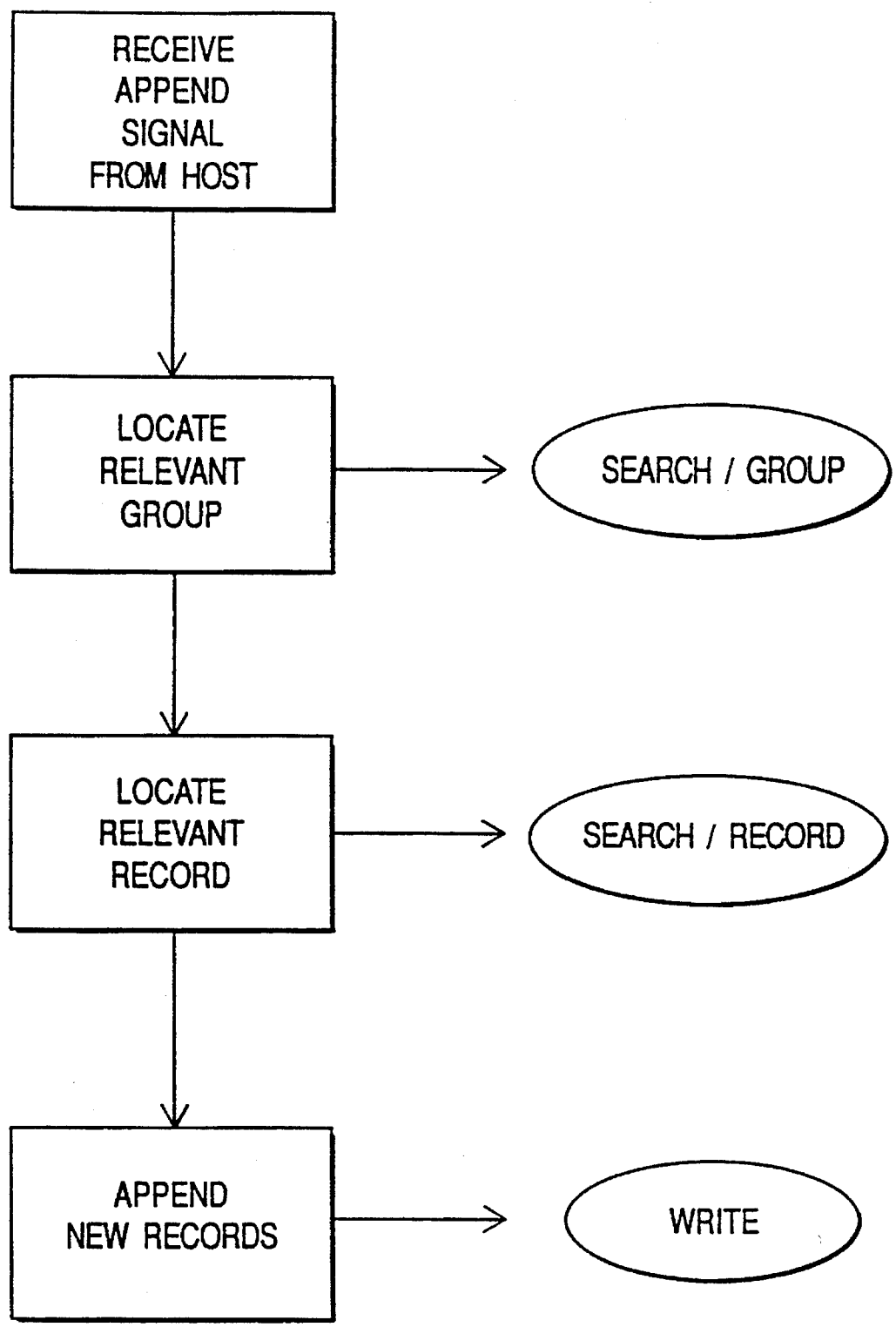

FIG. 23 shows the main steps in the append operation. When a signal from the host computer is received indicating that new records are to be appended after existing record number X, the first step is to locate the group containing record X. Then the block access table in the index of that group is read (backwards from the last entry) to locate record X within the group. Once record X is located, the new records are appended to tape.

Figure 24:
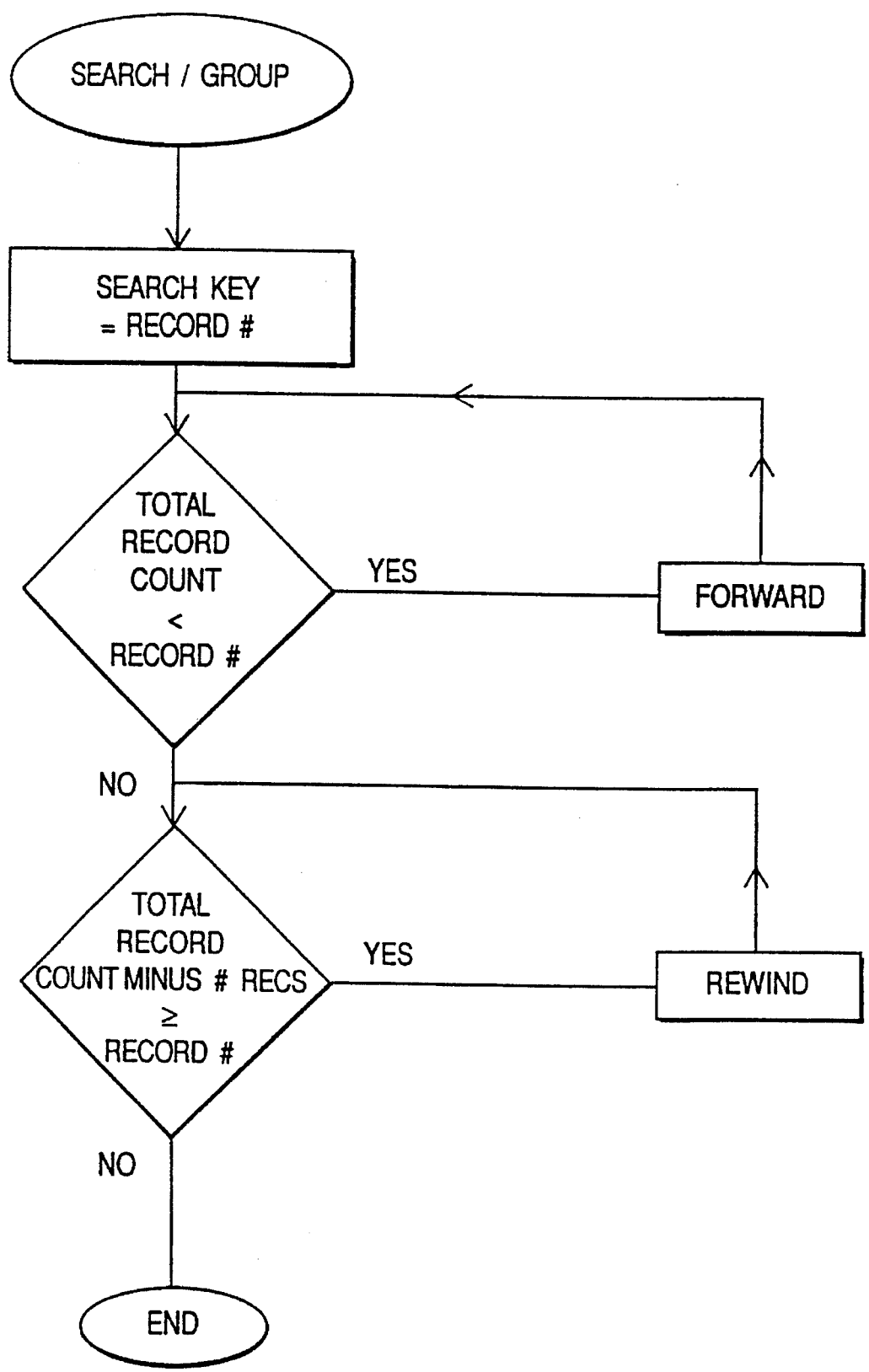
Figure 25:
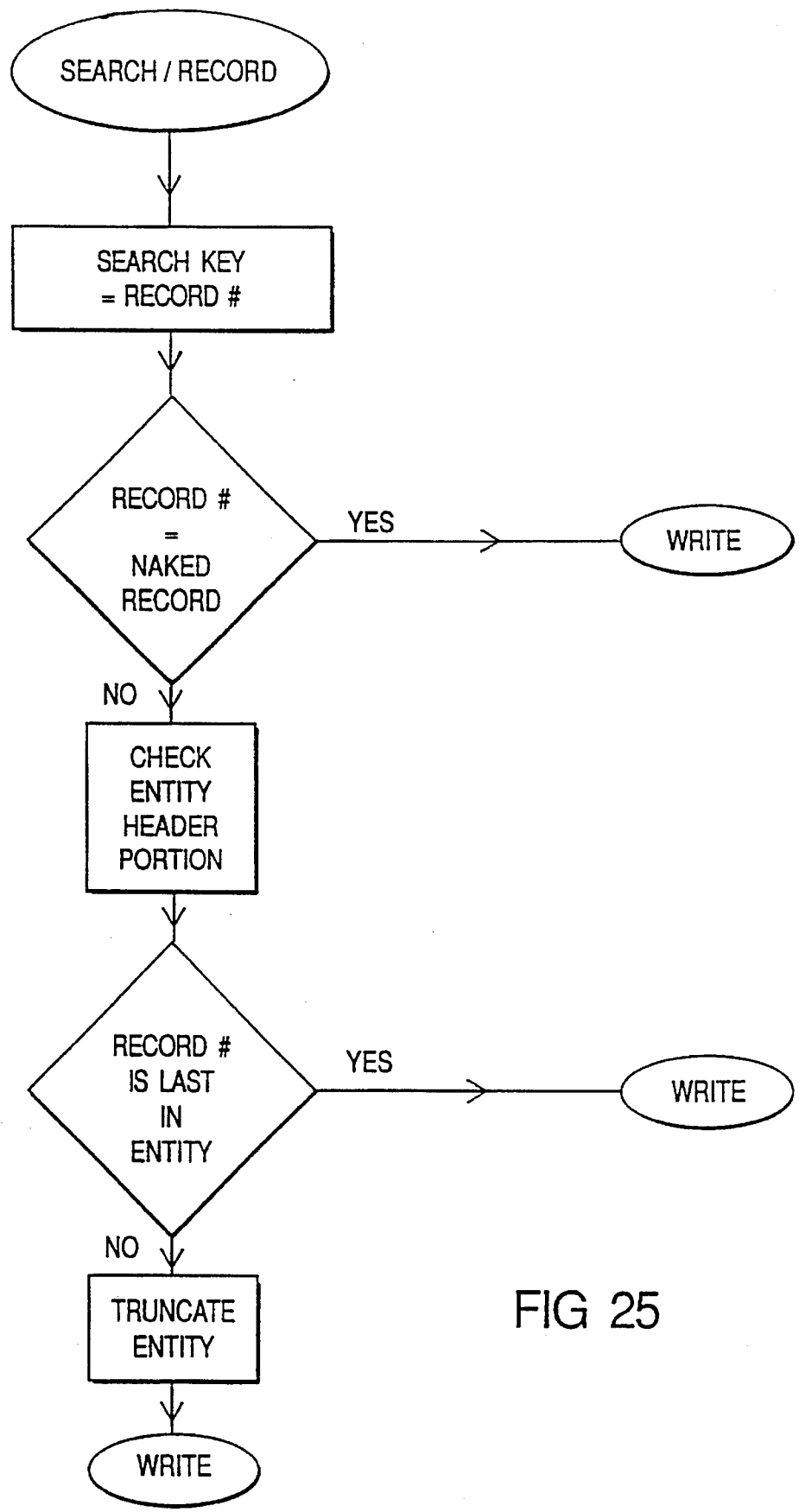

The search, and write operations will be more fully described with reference to FIGS. 24–26.

Referring to FIG. 14, upon the host issuing a command to append data, the controller 55 generates a search key having a value equal to the record count of the last record to be kept. The current total record count (Record Count) is held in the grouping unit 56 of the group processor 52.

If the Record Count stored in the group information table of the current group is less than the search key, the tape is wound forward until this is no longer true at which stage the relevant group has been found. Otherwise and if the total record count minus the number of records in the current group is greater than or equal to the search key, the tape is rewound until this is no longer true at which stage the relevant group has been located. Otherwise, the relevant group is the one first tested.

During the search operation the tape is advanced (or rewound as appropriate) at high speed (many times faster than normal) while the head drum is rotated at a speed to maintain the relative velocity of the heads HA, HB across the tape at a constant value; in this mode, it is possible to read the relevant Record Counts. Reading track sub areas at speed is a known technique and will therefore not be described in detail.

Once the relevant group has been located, the entries in the block access table of the group index are read to locate the position of record X. Referring to FIG. 25, if record X is a naked record, ie, not within an entity, the next step is to append the new records. Otherwise the relevant entity header portion is read to check whether record X is the last record in the entity. If it is, the next step is to append the new records. Otherwise the next step is to "truncate" the entity by changing the # RECS entry in the entity header portion to reflect the number of wanted records in that entity, ie, up to and including record X and then to append the new records.

Figure 26:
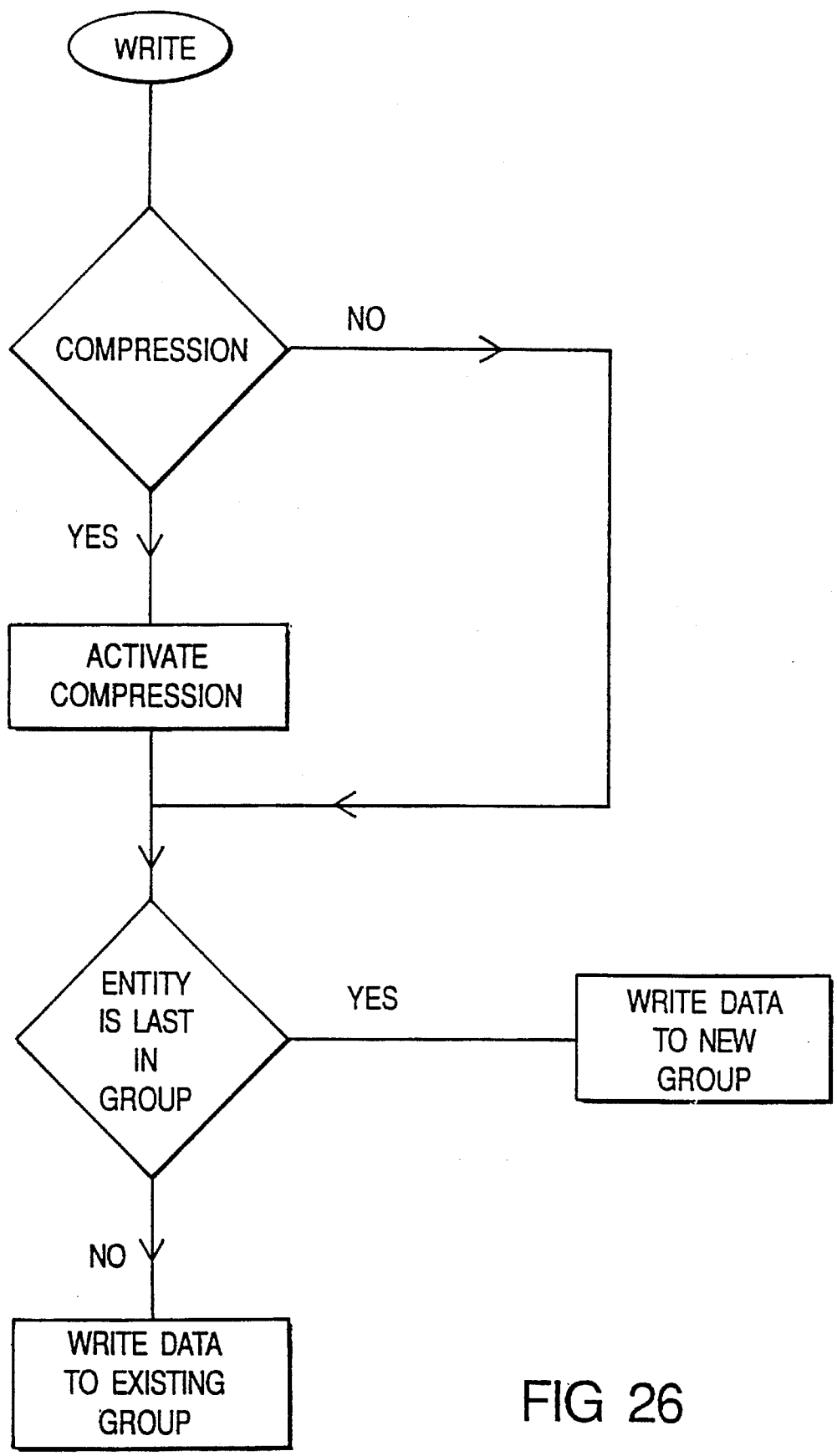

Referring to FIG. 26, if the data to be appended is to be compressed, the data compression system is activated accordingly. If the data is to be appended after the last entity or naked record in a group, it is written to a new group. Otherwise, the data is appended after the relevant entity or naked record of the existing group.

It can be seen that the present invention provides a simpler method of appending data to compressed data stored on tape. It is not particularly relevant whether the data being appended is compressed. Neither is the algorithm to be used to compress the existing data stored on tape particularly relevant or whether the compression was performed by a data compression chip in the tape drive or other piece of equipment or by data compression software.

The invention has been described in the context of a DDS-DC drive. It should be understood that the invention is applicable whenever compressed data records are stored on tape in a manner that the compressed byte counts for individual records are not readily available.

Furthermore, it is envisaged that the present invention can be utilised whenever data records are stored as collections of records and information on the contents of such collections is also stored.

What is claimed is:

1. A method of appending data to compressed data which has been previously stored on a sequentially-accessible data storage medium and which comprises a plurality of records, whereby said data being appended are to be retrievable instead of at least one of said plurality of records, said compressed data being stored in groups independently of organization of said records, each group having an associated index with at least one entry containing information indicative of that group's contents, said plurality of records comprising an entity within a said group and the group index for that group having a single entry therein for that entity and having substantially no entry therein related to any individual record of that entity, and said entity having stored in association therewith an indication of how many records are contained in said entity, said data being appended by a method comprising the steps of:

locating said entity;

changing said stored indication of how many records are contained in said entity to indicate how many records in said entity are thereafter to be considered as being present in said entity, said stored indication indicating at least one less record than previously; and writing said data being appended in a new entity on said medium subsequent to said entity, said stored indication that has been changed thereafter causing at least one record in said entity to be ignored even though still present on said storage medium.

2. A method according to claim 1 comprising storing said indication of how many records are contained in said entity in an entity header portion.

3. A method according to claim 1 wherein information specifying a cumulative total of records on said storage medium is stored, said method further comprising: changing said information to reflect how many of said records in said entity are thereafter to be considered as being present in said entity.

4. A method of appending data to data previously stored on a sequentially-accessible data storage medium, the data on said medium being stored in collections of records and information on the contents of each collection also being stored on said medium, whereby data being appended are to be retrievable instead of at least one of said records in a collection, comprising the steps of: locating the collection containing a last record to be considered thereafter as being retrievable, changing said information previously stored on said medium to newly indicate how many records in said collection are thereafter to be considered as being present in said collection, said newly indicated number of records being at least one less than previously and rendering any record in excess of said number of records in said collection to be thereafter ignored, and writing the data being appended to a subsequent new collection on said medium.

5. Apparatus for appending data to data previously stored on a sequentially-accessible data storage medium, the data on said medium being stored in collections of records, and information on the contents of each collection also being stored on said medium, whereby data being appended are to be retrievable instead of at least one of said records in a collection, comprising:

means for locating a collection containing a last record to be considered thereafter as being retrievable;

means for changing said information previously stored on said medium to indicate a number of records in that collection which are thereafter to be considered as being present in said collection said changed information indicating at least one record less than previously indicated, so as to render any record in said collection in excess of said number of records ignored by said apparatus; and means for writing the data being appended to a subsequent new collection on said medium.

* * * * *